US008032874B1

(12) United States Patent
Keller et al.

(10) Patent No.: US 8,032,874 B1
(45) Date of Patent: Oct. 4, 2011

(54) GENERATION OF EXECUTABLE THREADS HAVING SOURCE CODE SPECIFICATIONS THAT DESCRIBE NETWORK PACKETS

(75) Inventors: Eric R. Keller, Boulder, CO (US); Philip B. James-Roxby, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 1432 days.

(21) Appl. No.: 11/336,163

(22) Filed: Jan. 20, 2006

(51) Int. Cl.
*G06F 9/45* (2006.01)
*G06F 15/76* (2006.01)
(52) U.S. Cl. .......................................... 717/155; 712/37
(58) Field of Classification Search .......... 717/151–161; 712/37
See application file for complete search history.

(56) References Cited

U.S. PATENT DOCUMENTS

| 5,963,646 | A | 10/1999 | Fielder et al. | |
|---|---|---|---|---|
| 6,084,877 | A | 7/2000 | Egbert et al. | |
| 6,484,188 | B1 * | 11/2002 | Kwong et al. | 712/E9.084 |
| 6,499,027 | B1 | 12/2002 | Weinberger | |
| 6,795,917 | B1 * | 9/2004 | Ylonen | 713/160 |
| 6,971,084 | B2 | 11/2005 | Grey et al. | |
| 6,981,077 | B2 | 12/2005 | Modelski et al. | |
| 7,020,867 | B2 | 3/2006 | Underseth et al. | |
| 7,028,304 | B1 | 4/2006 | Weinberger et al. | |
| 7,117,504 | B2 | 10/2006 | Smith et al. | |
| 7,254,809 | B2 * | 8/2007 | Kurhekar et al. | 717/149 |
| 7,373,641 | B2 * | 5/2008 | Ogasawara | 717/151 |
| 2001/0053220 | A1 | 12/2001 | Kocher et al. | |
| 2002/0064279 | A1 | 5/2002 | Uner | |
| 2003/0088854 | A1 | 5/2003 | Wygodny et al. | |
| 2005/0028141 | A1 * | 2/2005 | Kurhekar et al. | 717/149 |
| 2005/0076169 | A1 | 4/2005 | Modelski et al. | |
| 2005/0144594 | A1 | 6/2005 | Yamazaki | |
| 2006/0045264 | A1 | 3/2006 | Kocher et al. | |
| 2008/0244372 | A1 | 10/2008 | Rohall et al. | |

OTHER PUBLICATIONS

Aho, Alfred V., Ravi Sethi, and Jeffrey D. Ullman. "The Principal Sources of Optimization", in Compilers: Principles, Techniques, and Tools. 1986. Addison-Wesley, 1st edition. pp. 592-599.*
U.S. Appl. No. 10/769,592, filed Jan. 30, 2004, Brebner et al.
U.S. Appl. No. 10/769,330, filed Jan. 30, 2004, James-Roxby et al.
U.S. Appl. No. 11/067,431, filed Feb. 25, 2005, Keller et al.
U.S. Appl. No. 10/769,591, filed Jan. 30, 2004, Kulkarni et al.
U.S. Appl. No. 10/769,331, filed Jan. 30, 2004, Keller et al.
U.S. Appl. No. 11/336,211, filed Jan. 20, 2006, Philip B. James-Roxby, et al., Xilinx, Inc. 2100 Logic Drive, San Jose, California 95124.

* cited by examiner

*Primary Examiner* — Li Zhen
*Assistant Examiner* — Erika Kretzmer
(74) *Attorney, Agent, or Firm* — LeRoy D. Maunu

(57) ABSTRACT

From source code specification of each of a plurality of threads, those variables of a data structure referenced by the thread are determined. For each thread, a respective adaptation of the source code specification of the data structure is generated. Each adaptation includes only variables of the data structure that are referenced in the respective thread. The source code specifications of the threads are compiled into respective object code segments using the respective adaptations of the data structures. Each object code segment requires memory space for the data structure for only those variables included in the respective adaptation. The source code specification of the data structure describes a network packet, and the respective object code segments are configured to operate on the respective portions of the network packet stored in separate memories while executing on respective processors.

15 Claims, 17 Drawing Sheets

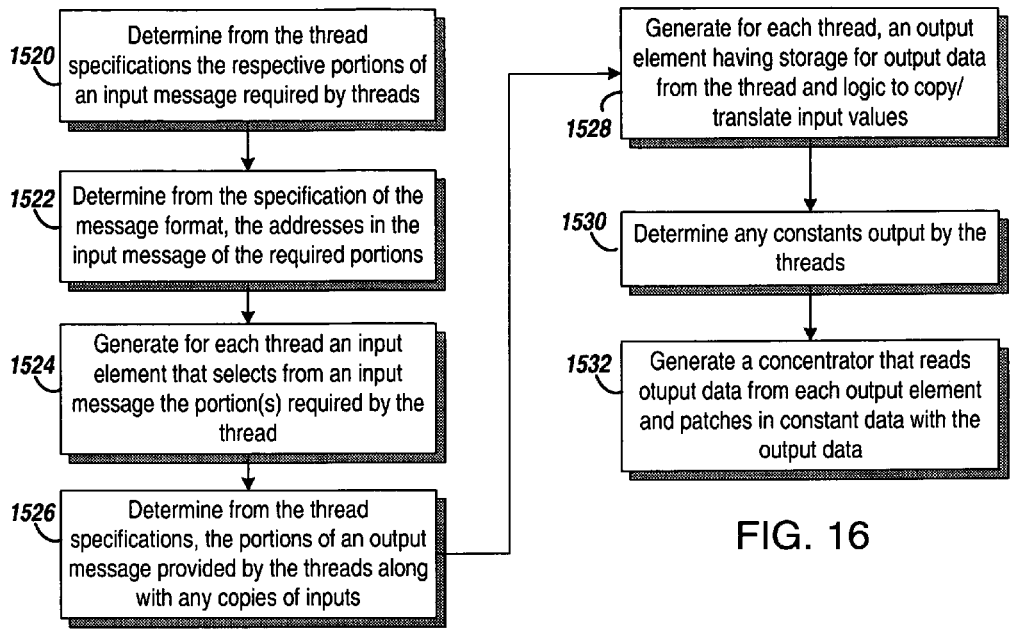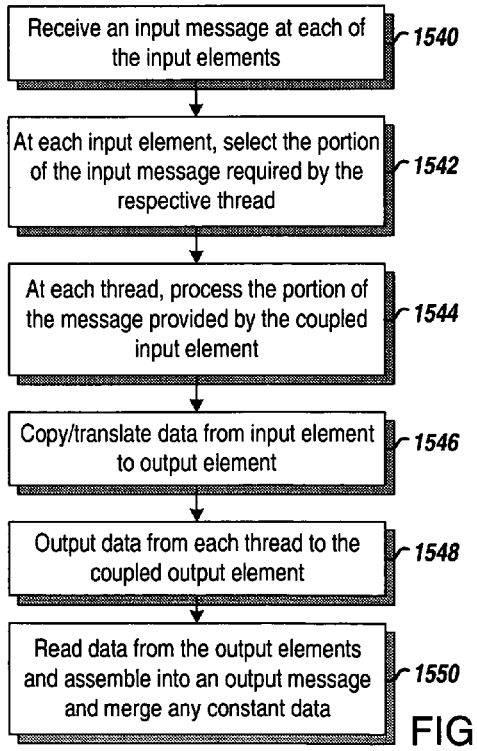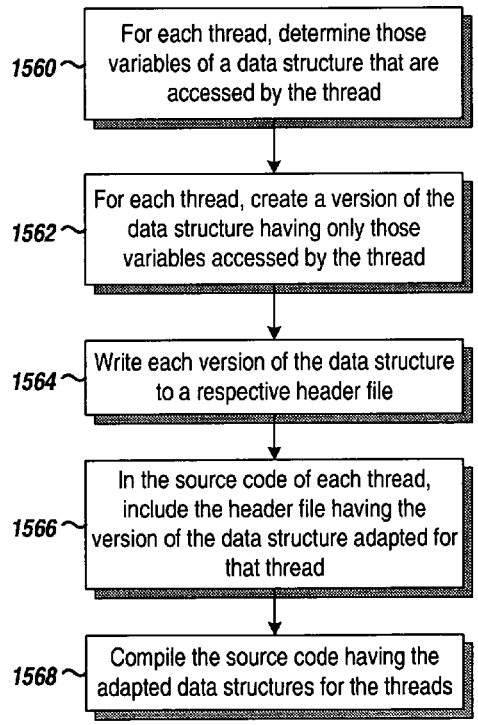
FIG. 16
FIG. 17
FIG. 18

US 8,032,874 B1

GENERATION OF EXECUTABLE THREADS HAVING SOURCE CODE SPECIFICATIONS THAT DESCRIBE NETWORK PACKETS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to generating executable threads.

BACKGROUND

Programmable logic devices (PLDs) exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

An FPGA typically includes an array of configurable logic blocks (CLBs) surrounded by a ring of programmable input/output blocks (IOBs). The CLBs and IOBs are interconnected by a programmable interconnect structure. The CLBs, IOBs, and interconnect structure are typically programmed by loading a stream of configuration data (known as a bitstream) into internal configuration memory cells that define how the CLBs, IOBs, and interconnect structure are configured. Additionally, an FPGA may include embedded memory, such as block random access memories (BRAMs), one or more microprocessors, sometimes referred to as embedded cores, and digital clock managers (DMs). The combination of components on an FPGA may be used for system-level integration, sometimes referred to as "system-on-a-chip" (SOC).

Historically, FGPAs have not been employed in network processing applications. Rather, network devices, such as routers, employ dedicated, special purpose components for processing packets that propagate through the network. Conventionally, network devices employ network processors or application specific integrated circuits (ASICs) to provide the desirable packet processing/network processing functions. Such processor- or ASIC-based architectures, however, are static in nature, providing a fixed amount of resources for packet processing/network processing functions. In network processors for example, whole packets are stored in memory, and multiple processing elements contend for access to the memory and interconnect resources. Furthermore, some of the processing elements may access the same fields of a packet and do so multiple times, thereby further increasing contention for resources. Accordingly, there exists a need in the art for more flexible message processing architectures.

The present invention may address one or more of the above issues.

SUMMARY OF THE INVENTION

The various embodiments of the invention provide for generating executable threads. In one embodiment, from source code specification of each of a plurality of threads, those variables of a data structure referenced by the thread are determined. For each thread, a respective adaptation of the source code specification of the data structure is generated. Each adaptation includes only variables of the data structure that are referenced in the respective thread. The source code specifications of the plurality of threads are compiled into respective object code segments using the respective adaptations of the data structures. Each object code segment requires memory space for the data structure for only those variables included in the respective adaptation.

In another embodiment, an apparatus is provided for generating executable threads. The apparatus includes means for determining from source code specification of each of a plurality of threads, variables of a data structure referenced by the thread; means for generating for each source code specification of the plurality of threads, a respective adaptation of the source code specification of the data structure, wherein each adaptation for the source code specification of a thread includes only variables of the data structure that are referenced in the respective thread; and means for compiling into respective object code segments, the source code specifications of the plurality of threads using the respective adaptations of the data structures, wherein each object code segment requires memory space for the data structure for only those variables included in the respective adaptation.

In yet another embodiment, a processor-readable medium is configured with processor-executable instructions for generating executable threads.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which:

FIG. 16 is a flowchart of a process for generating a system for multi-thread processing of messages in accordance with various embodiments of the invention;

FIG. 17 is a flowchart of a process for processing input messages by multiple threads in accordance with various embodiments of the invention;

FIG. 18 is a flowchart of a process for converting a common data structure into individual data structures for use by multiple threads operating from separate memories and processors;

DETAILED DESCRIPTION

Overview

Figure 1:
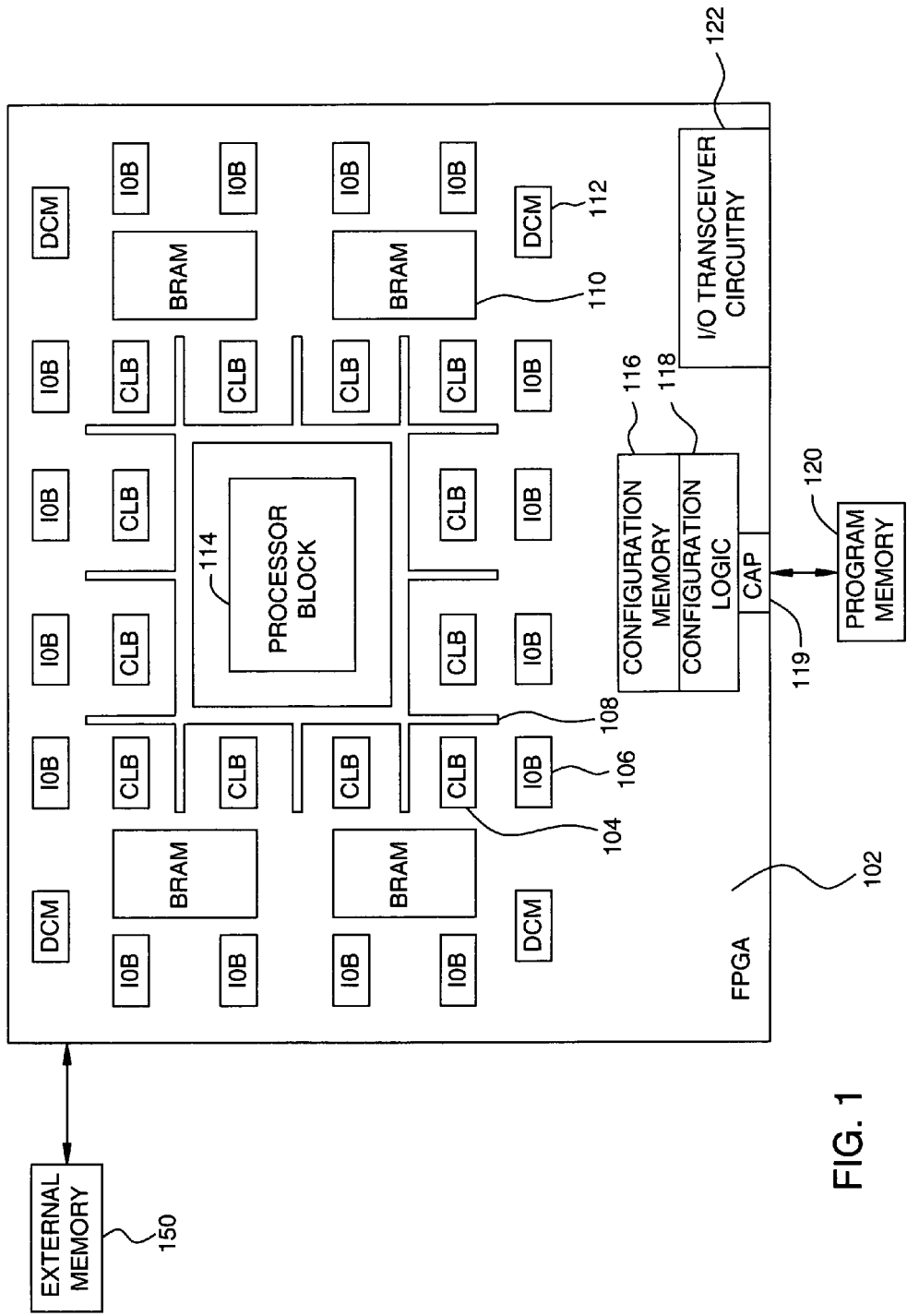
FIG. 1 is a block diagram depicting an exemplary embodiment of an FPGA coupled to external memory and a program memory.

One or more aspects of the invention are related to a configurable and programmable micro-architecture for implementing message-processing (MP) systems ("soft platform architecture"). As used herein, the term "message" encompasses packets, cells, frames, data units, and like type blocks of information known in the art that may be passed over a communication channel. A "message-processing" system is a system or subsystem for processing messages (e.g., a packet processing system or a network processing system). The soft platform architecture is "message-centric" to match the nature of MP systems. That is, the processing components of the MP system go to the messages, as opposed to the messages coming to the processing components.

A MP system may be implemented using a plurality of threads and a broadcast channel. Each of the threads processes a respective portion of a multi-word message, and the broadcast channel is used to transmit the message to the threads. One of the threads receives an input message and writes data from the message to the broadcast channel. This thread may be referred to as the broadcaster thread. The broadcast channel receives as input one word at a time and outputs two words at a time. The broadcast channel indicates which words of the message are present on the channel by outputting a message-relative offset of the first-transmitted word of the two-word pair. A receiver thread may read data from the broadcast channel when desired words of the message are present on the channel as indicated by the offset provided by the channel.

Briefly stated, a designer specifies attributes for an MP system, such as structural and behavioral attributes for processing components and memory components. For example, the designer may employ a set of descriptions or "primitives" that parametrically define the MP system attributes. The primitives provide an abstract mechanism for defining the MP system. A design tool embodying the soft platform architecture may include a programming interface for generating a logical description or "logical view" of an MP system based on the designer-specified attributes.

Notably, the logical view includes logical components of the soft platform architecture configured in accordance with the designer-specified MP system. In particular, the soft platform architecture includes a memory model component and a multithreading component. A physical view of the MP system may then be generated based on the logical view. The physical view includes physical components of an integrated circuit architecture that implement the logical components of the soft platform architecture. The physical view may then be processed to generate configuration data for the integrated circuit to realize the designer-specified MP system (e.g., a configuration bitstream for a PLD or mask data for an ASIC). Thus, the soft platform architecture provides a mechanism by which a designer may design an MP system in an abstract fashion, without knowledge of the particular physical configuration of the integrated circuit.

One or more aspects of the invention are described with respect to a programmable architecture for implementing a message processing system using an FPGA. While the invention is described with specific reference to an FPGA, those skilled in the art will appreciate that other types of programmable devices, including programmable logic devices and partially programmable devices, may be used, such as complex programmable logic devices (CPLDs). In addition, other types of mask-programmable devices may be used, such as application specific integrated circuits (ASICs). Those skilled in the art will appreciate that, if an ASIC is employed rather than a PLD, then mask data is generated in place of a configuration bitstream.

FIG. 1 is a block diagram depicting an exemplary embodiment of an FPGA 102 coupled to external memory 150 and a program memory 120. The external memory 150 may comprise, for example, synchronous dynamic RAM (SDRAM), double-data rate SDRAM (DDR SDRAM), Rambus® RAM (RDRAM), and the like. For purposes of clarity by example, the memory 150 is referred to as "external" in that the memory 150 is not part of the FGPA 102. It is to be understood, however, that the external memory 150 and the FPGA 102, or portions thereof, as well as various other devices, may be integrated onto a single chip to form a single system-level integrated circuit (commonly referred to as a "system-on-a-chip" or SoC).

The FPGA 102 illustratively comprises programmable logic circuits or "blocks", illustratively shown as CLBs 104, IOBs 106, and programmable interconnect 108 (also referred to as "programmable logic"), as well as configuration memory 116 for determining the functionality of the FPGA 102. The FPGA 102 may also include one or more embedded processor blocks 114, as well as various dedicated internal logic circuits, illustratively shown as blocks of random access memory ("BRAM 110"), configuration logic 118, digital clock management (DCM) blocks 112, and input/output (I/O) transceiver circuitry 122. Those skilled in the art will appreciate that the FPGA 102 may include other types of logic blocks and circuits in addition to those described herein. Note that the illustrated arrangement is merely a simplified example of one possible arrangement, and other arrangements are possible and will be known to those of skill in the art.

As is well known in the art, the IOBs 106, the CLBs 104, the programmable interconnect 108, and other programmable resources may be configured to perform a variety of functions. Notably, the CLBs 104 are programmably connectable to each other, and to the IOBs 106, via the programmable interconnect 108. Each of the CLBs 104 may include one or more "slices" and programmable interconnect circuitry (not shown). Each CLB slice may in turn include various circuits, such as flip-flops, function generators (e.g., a look-up tables (LUTs)), logic gates, memory, and like type well-known circuits. The IOBs 106 are configured to provide input to, and receive output from, the CLBs 104.

Configuration information for the CLBs 104, the IOBs 106, and the programmable interconnect 108 is stored in the configuration memory 116. The configuration memory 116 may include static random access memory (SRAM) cells. The configuration logic 118 provides an interface to, and controls configuration of, the configuration memory 116. A configuration bitstream provided from the program memory 120 may be coupled to the configuration logic 118 through a configuration port 119. The configuration process of FPGA 102 is also well known in the art.

The I/O transceiver circuitry 122 may be configured for communication over any of a variety of media, such as wired, wireless, and photonic, whether analog or digital. The I/O transceiver circuitry 122 may comprise gigabit or multi-gigabit transceivers (MGTs). The DCM blocks 112 provide well-known clock management circuits for managing clock signals within the FPGA 102, such as delay lock loop (DLL) circuits and multiply/divide/de-skew clock circuits.

The processor block 114 comprises a microprocessor core, as well as associated control logic. Notably, such a microprocessor core may include embedded hardware or embedded firmware or a combination thereof for a "hard" or "soft" microprocessor. A soft microprocessor may be implemented using the programmable logic of the FPGA 102 (e.g., CLBs 104, IOBs 106). For example, a MicroBlaze™ soft microprocessor, available from Xilinx® of San Jose, Calif., may be employed. A hard microprocessor may be implemented using an IBM Power PC, Intel Pentium, AMD Athlon, or like type processor core known in the art.

The processor block 114 is coupled to the programmable logic of the FPGA 102 in a well known manner. For purposes of clarity by example, the FPGA 102 is illustrated with 12 CLBs, 16 IOBs, 4 BRAMs, 4 DCMs, and one processor block. Those skilled in the art will appreciate that actual FPGAs may include one or more of such components in any number of different ratios and different arrangements. For example, the FPGA 102 may be selected from the Virtex™-II Pro family of products, commercially available from Xilinx® of San Jose, Calif.

Soft Platform

Figure 2:
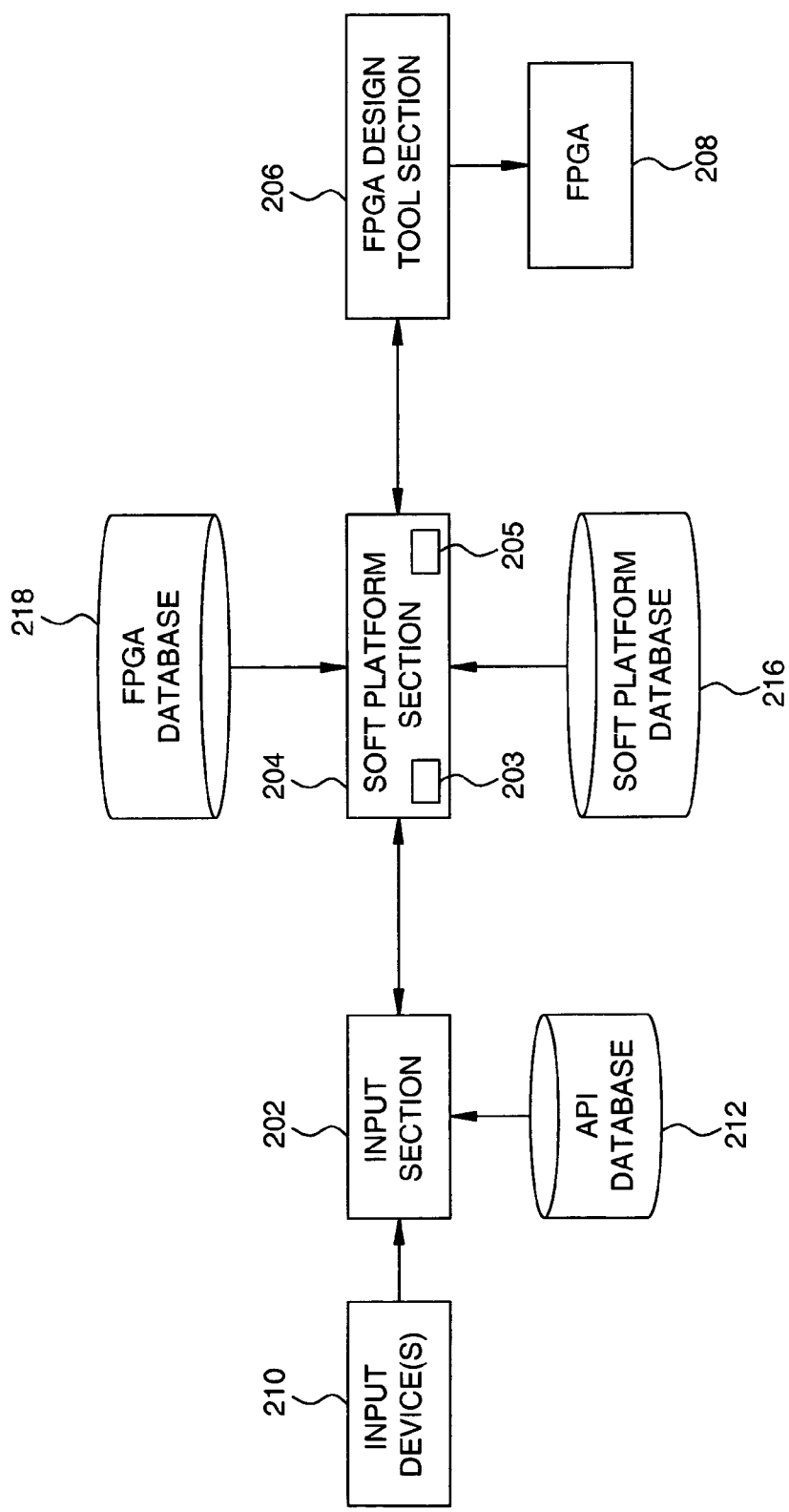
FIG. 2 is a block diagram depicting an exemplary embodiment of a design tool for designing a message processing system for implementation using an FPGA.

FIG. 2 is a block diagram depicting an exemplary embodiment of a design tool 200 for designing an MP system for implementation using an FPGA. The design tool 200 comprises an input section 202, a soft platform section 204, and an FPGA design tool section 206. Briefly stated, the soft platform section 204 provides a configurable and programmable soft platform architecture for implementing MP systems. An MP system implemented using the soft platform architecture is mapped onto an FPGA architecture to produce a physical circuit design. The MP system may be realized by configuring an FPGA 208 in accordance with the circuit design. Thus, the soft platform architecture provides a mapping between a logical, message-centric system design and a physical, interface-centric system implemented within the FPGA 208.

The FPGA circuit design may be "interface-centric" in that the circuit design is driven by the behavior at the system interfaces, as opposed to the "processor-centric" model, where the circuit design is driven by the behavior of an embedded processor. The interface-centric circuit design model matches well with the message-centric style of the soft platform architecture. Placement and usage of interfaces, memories, and their interconnections dominate the allocation of FPGA architecture features, and then allocation of functional elements (e.g., programmable logic, embedded processors) for the process components follow as a derivative.

More specifically, the input section 202 is coupled to one or more input devices 210 and a database storing an application programming interface (API) ("API database 212"). The API database 212 includes a set of primitives associated with structural and behavioral attributes of the soft platform architecture. Thus, the API provides a "programming interface" for the soft platform architecture. An exemplary embodiment of a programming interface for a soft platform architecture is described below in the section entitled "PROGRAMMING INTERFACE." Using the input devices 210, a designer may interact with the input section 202 to produce specification data for an MP system or subsystem if the MP circuit is part of a larger system (hereinafter referred to as an "MP system").

In one embodiment, a designer may use the primitives in the API database 212 directly to produce the MP system specification data for the soft platform architecture. In another embodiment, a designer may design the MP system using alternate constructions provided by the input section 202. That is, the input section 202 may comprise a design entry tool specific to the MP domain. Examples of such MP-specific design-entry tools include Click (available from The Massachusetts Institute of Technology), Rave (available from Cloudshield™ of Sunnyvale, Calif.), and SDL (a telecom standard from ITU-T). The input section 202 may then map the MP system specified using the alternate constructions onto the primitives in the API database 212 for the soft platform architecture. Thus, the input section 202 may provide a different level of abstraction than that provided by the soft platform architecture.

In one embodiment of the invention, the MP system specification data may comprise program code for programmatically interacting with the soft platform section 204. The program code may be callable by an external design tool of the input section 202. In another embodiment, the MP system specification data may comprise interpretive descriptions (e.g., descriptions in a textual or binary format) that the soft platform section 204 may interpret (e.g., an XML format). In either embodiment, the MP system specification is used to configure the soft platform architecture.

The soft platform section 204 is coupled to the input section 202 for receiving the MP system specification data. The soft platform section 204 is also coupled to a database storing the features or attributes of the soft platform architecture ("soft platform database 216"), and a database storing features or attributes of the architecture of the FPGA 208 ("FPGA database 218").

The soft platform section 204 includes a first portion 203 for generating a logical description or "logical view" of an MP system in accordance with the MP system specification. The logical view is defined in terms of the logical components of the soft platform architecture stored in the soft platform database 216. The soft platform section 204 includes a second portion 205 for generating a physical view of the MP system. Notably, using information in the FPGA database 218, the soft platform section 204 maps the logical view of the MP system defined in terms of the soft platform architecture onto the architecture of the FPGA 208. The soft platform section 204 provides FPGA design data as output, which represents a "physical view" of the MP system in terms of the architecture of the FPGA 208. Details of the soft platform architecture are described below with respect to FIG. 4.

The FPGA design tools section 206 is coupled to the soft platform section 204 for receiving the FPGA design data. The FPGA design data may comprise a physical description of the MP system specified by the designer in terms of the components and features of the FPGA 208. For example, in one embodiment, the FPGA design data may comprise a hardware description language (HDL) representation of the MP system design (e.g., Very high-speed integrated circuit description language (VHDL) or Verilog). The FPGA design tools section 206 processes the FPGA design data to produce configuration bitstream data. For example, the FPGA design tools section 206 may comprise various well-known FPGA design tools, such as a synthesis tool, a map/place/route tool, and like-type tools known in the art. The FPGA design tools section 206 provides configuration bitstream data as output, which may be loaded into the FGPA 208.

Figure 3:
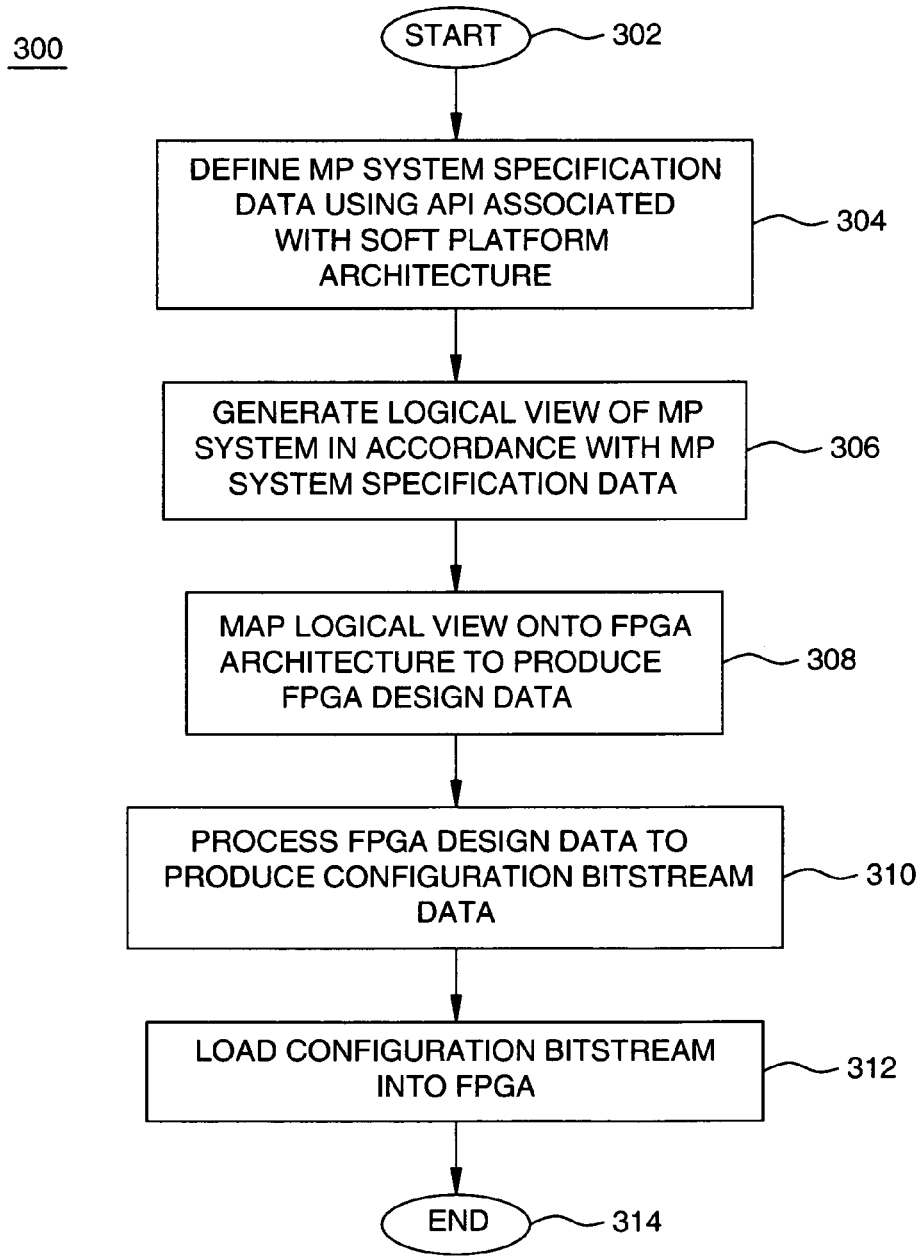
FIG. 3 is a flow diagram depicting an exemplary embodiment of a process for designing a message processing system for implementation within an FPGA.

FIG. 3 is a flow diagram depicting an exemplary embodiment of a process 300 for designing an MP system for implementation using FPGA. The process 300 may be performed by the design tool 200 shown in FIG. 2. The process 300 begins at step 302. At step 304, an MP system specification is defined using an API associated with a soft platform architecture. The MP system specification specifies attributes of an MP system, such as processing operations and memory attributes. As described above, the API may be programmatic (e.g., software function calls) or interpretive (e.g., XML).

At step 306, a logical view of the MP system is generated in accordance with the MP system specification. As described above, the logical view of the MP system is defined in terms of a soft platform architecture. The logical components of the soft platform architecture are configured in accordance with the MP system specification to generate the logical view of the MP system. The term "logical components" refers to both the structural and behavioral attributes of the soft platform architecture, described in more detail below.

At step 308, the logical view of the MP system is mapped onto an FPGA architecture to produce FPGA design data. That is, the logical components comprising the logical view are linked to physical components of an FPGA and, optionally, other devices connected to the FPGA (e.g., external memories). In one embodiment of the invention, the FPGA design data comprises an HDL representation of the MP system design. As described above, the FPGA design data provides a physical view of the specified MP system in terms of the architecture of the FPGA. That is, FPGA design data corresponds to the physical implementation of the logical view of the MP system on an FPGA device.

At step 310, the FPGA system design is processed to produce configuration bitstream data. For example, if the FPGA system design comprises an HDL representation of the MP system design, the FPGA system design may be synthesized, mapped, placed, and routed in a well-known manner to produce bitstream data for configuring an FPGA. At step 312, the configuration bitstream data is loaded into an FPGA to realize the MP system specified at step 304. The process 300 ends at step 314.

Figure 4:
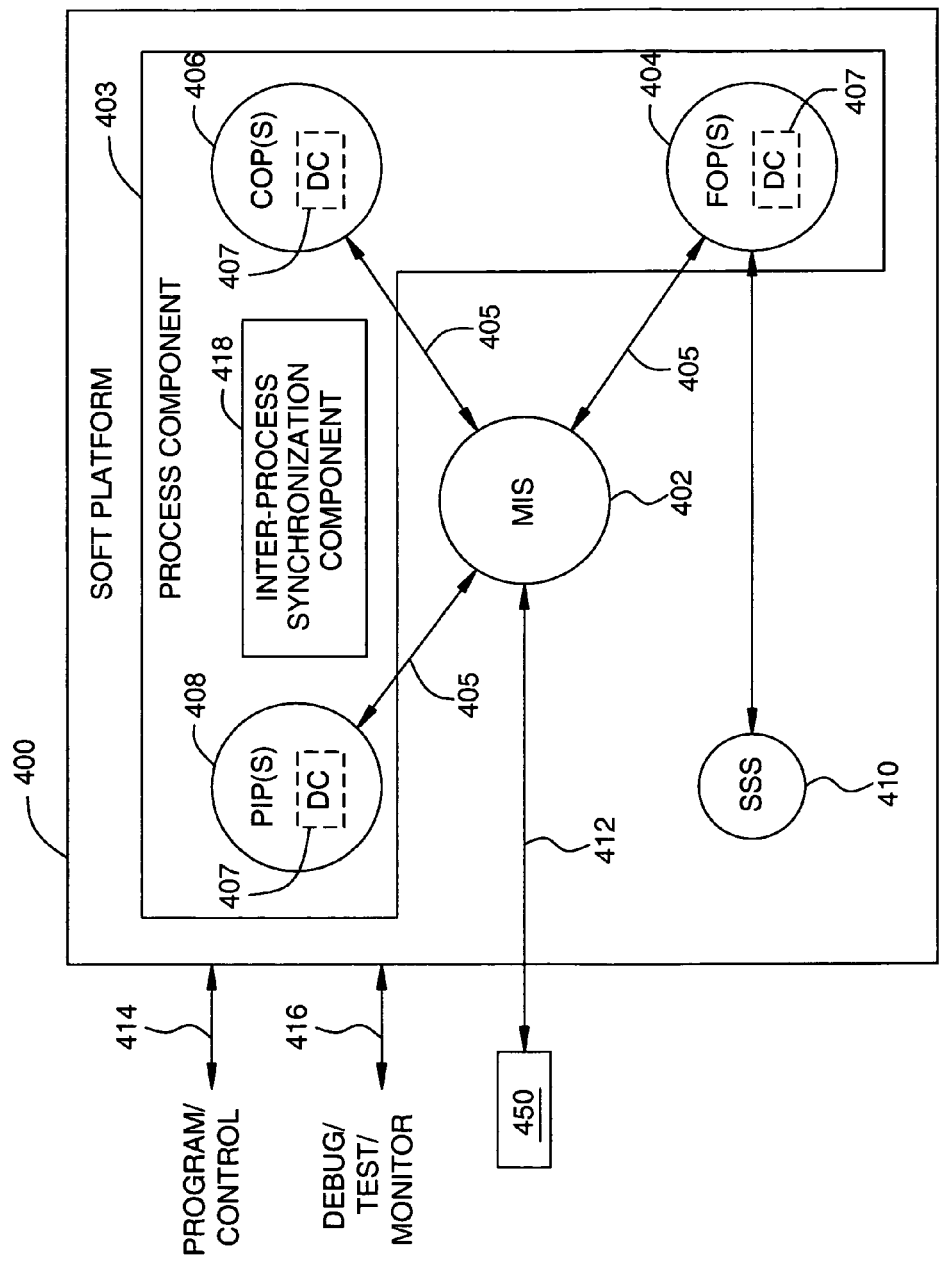
FIG. 4 is a block diagram depicting an exemplary embodiment of a soft platform architecture in accordance with one or more aspects of the invention.

FIG. 4 is a block diagram depicting an exemplary embodiment of a soft platform architecture 400 in accordance with one or more aspects of the invention. The soft platform architecture 400 comprises a messages in system (MIS) component 402, a process component 403, and a stored system state (SSS) component 410. The MIS component 402, the process component 403, and the SSS component 410 are logical components with no implied physical implementations. The physical implementations of the MIS component 402, the process component 403, and the SSS component 410 may be programmable, static, or partially programmable and partially static. The programmable portion of any of the MIS component 402, the process component 403, and the SSS component 410 may be conveyed via API primitives that define specification data generated by a designer.

The soft platform architecture 400 includes a programming/control interface 414 and a debug/test/monitor interface 416. The programming/control interface 414 conveys the data for configuring the programmable portions of the soft platform architecture 400. The programming/control information conveyed via the programming/control interface 414 comprises the structural and behavioral information related to the MIS component 402, the process component 403, and the SSS component 410. An exemplary embodiment of a programming interface to the soft platform architecture 400 is described below in the section entitled "PROGRAMMING INTERFACE." The debug/test/monitor interface 416 may be used during the design and implementation of an MP system defined in terms of the soft platform architecture 400. The interfaces 414 and 416 are illustrative, as there may be a single shared interface, or more than two interfaces.

The MIS component 402 is the logical storage point for all messages currently within the system implemented using the soft platform architecture 400. The MIS component 402 includes an interface 412 to the enclosing environment 450 allowing for the input and output of messages. For example, the soft platform architecture 400 may be configured to produce an internet protocol (IP) packet router. The MIS component 402 may be configured to store all IP packets currently in flight through the router. The interface 412 may be one or more ports by which the router is connected to a physical network.

The MIS component 402 may be physically implemented using a centralized memory device, a plurality of distributed memory devices, or a combination thereof. In addition, the types, sizes, and interconnections of the physical memory elements, as well as the interface to such physical memory elements, are programmable through configuration of the MIS component 402. An exemplary embodiment of a logical memory configuration that may be used as the MIS component 402 is described below in the section entitled "MEMORY MODEL."

The process component 403 comprises one or more processes that may be classified as fine grain operations processes (FDPs) 404, coarse grain operations processes (COPs) 406, or perimeter interface processes (PIPs) 408. In addition, the process component 403 includes an inter-process synchronization component 418. The FOPs 404, COPs 406, and PIPs 408 operate on messages stored within the MIS component 402. The term "process," as used herein, denotes a concurrent agent for operating on information stored within the MIS component 402. The term "thread" is used to denote an instance of a process.

Each single execution of a process within the process component 403 is associated with a message stored in the MIS component 402 through a message context 405. A process in the process component 403 may be physically implemented directly in programmable logic of an FPGA, or in a soft or hard embedded processor of an FPGA. In one embodiment of the invention, the message context 405 may be implemented using a data counter (DC) component 407. The DC component 407 points to the current position in the current message being operated on by a particular process in the process component 403. As the process executes, the DC component 407 may be updated, either automatically to advance to the next position in a message, or by execution of programmed "data jumps." In essence, the process moves over the message. The DC component 407 may be physically implemented using a memory element within the FPGA capable of storing an address associated with the location of a message in the memory of the MIS component 402. Depending on the memory organization of the MIS component 402, the DC component 407 may be a register, a BRAM, or an external RAM.

The processes of the process component 403 include a common interface. The inter-process communication component 418 may utilize the common interface to allow interaction between processes of the process component 403. Such interactions may include, for example, creating or destroying a process or passing data to another process. The inter-process communication component 418 provides for a control flow in the processing of a message. At a microscopic level, the inter-process communication component 418 is capable of providing a control flow within a single process's execution. At a macroscopic level, the inter-process communication component 418 is capable of providing a control flow from one process's execution to another process's execution. An exemplary embodiment of a multithread model that may be used as the inter-process communication component 418 is described below in the section entitled "MULTITHREAD MODEL."

A FOP 404 is the basic programmable unit for message processing. A FOP 404 performs a sequence of steps on a message stored within the MIS component 402. At each step, a set of concurrent operations are performed. A FOP 404 may be associated with a DC component 407. After each step, the DC component 407 may be incremented, or a data jump operation performed, such that the FOP 404 accesses a new portion of the message. The steps, as well as the operations performed during each step, may be programmable, static, or partially programmable and partially static in their definition. Examples of operations include, inspecting a field (e.g., a 16-bit header field) of a message, or performing simple arithmetic (e.g., adding one to a 16-bit header field) on a message.

A FOP 404 may be implemented within an FPGA using programmable logic. For example, a FOP may be implemented as a finite state machine (FSM) configured within the programmable logic of the FPGA. Alternatively, a FOP may be implemented on an embedded processor within an FPGA. For example, a FOP may be implemented as an operating system thread executed by the embedded processor. The physical implementation of a FOP 404 may be programmable, static, or partially programmable and partially static in its definition.

A COP 406 is used to incorporate a function block to perform a message processing operation. A function block may comprise a circuit or subsystem defined outside the context of the soft platform architecture 400. For example, the function block may comprise a reusable intellectual property (IP) core for an FPGA. A COP 406 provides a programmable adapter between the interface of the function block and the common interface of the process component 403. A COP 406 may be started, stopped, or interrupted by another process of the process component 403.

A COP 406 may be defined statically and be in existence permanently. Alternatively, a COP 406 may be created and destroyed dynamically to allow dynamic reconfiguration of the function blocks associated therewith. For example, a COP 406 may be used to incorporate a function block for compression or encryption of all or part of a message stored in the MIS component 402. A COP 406 may be associated with a DC component 407, which points to the beginning of the message in the MIS component 402 to be processed by the COP 406.

A PIP 408 is concerned with enabling the movement of a message to and from soft platform architecture 400. In one embodiment of the invention, a PIP 408 may be used to incorporate a function block, similar to a COP 406. The function block associated with a PIP 408 may comprise a circuit or subsystem defined outside the context of the soft platform architecture 400 that is specifically geared to perform I/O functions. In another embodiment of the invention, a PIP 408 may be implemented as a FSM in programmable logic of the FPGA.

For example, a PIP may be used to receive or transmit successive words of a message over an interface using a protocol defined for the interface. For example, a PIP may act as a smart adapter for the Xilinx® LocalLink interface to a networking core or the interface to a Gigabit MAC core. A PIP may also communicate with other system components implemented within the FPGA.

The SSS component 410 may be used to store state information associated with the processes of the process component 403. For example, the SSS component 410 may be used to store a message context 405 for a FOP 404. The SSS component 410 may be physically implemented using a centralized memory device, a plurality of distributed memory devices, or a combination thereof.

Memory Model

Figure 5:
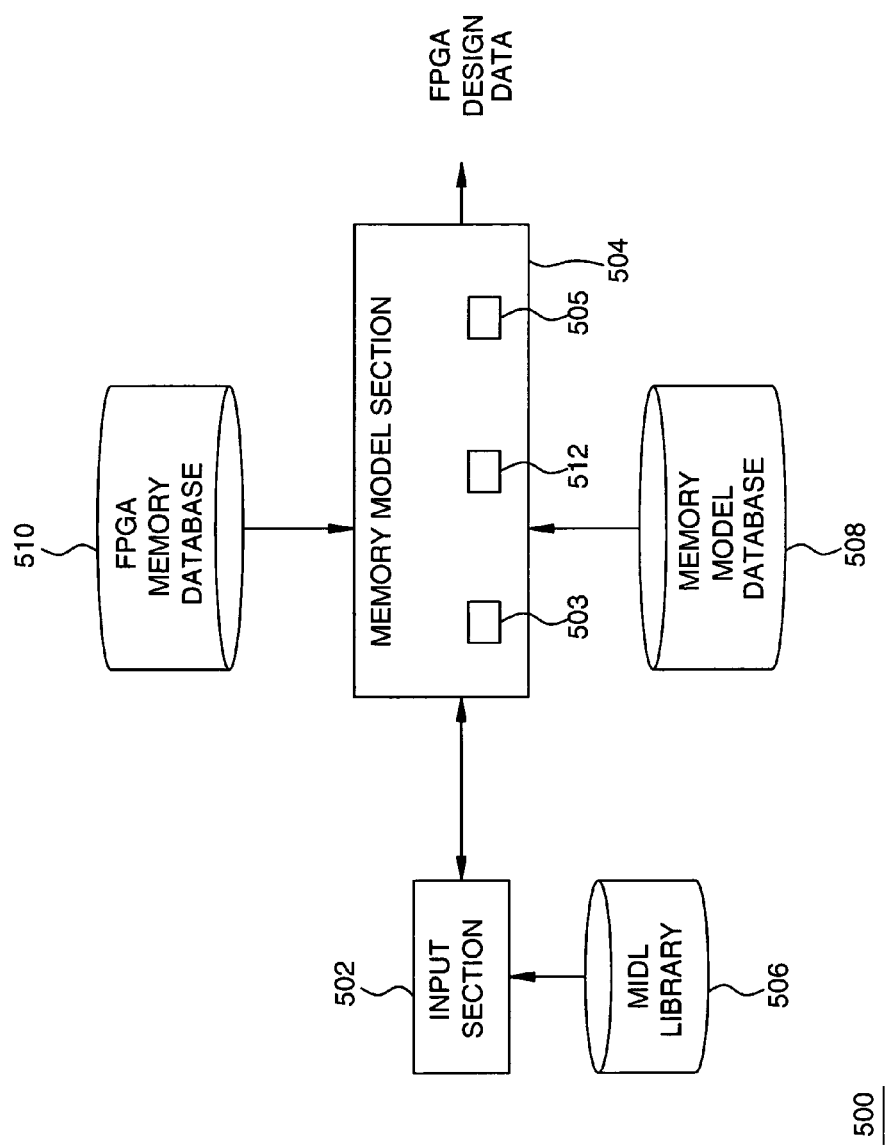
FIG. 5 is a block diagram depicting an exemplary embodiment of a design tool for designing a memory subsystem for implementation using an FPGA.

FIG. 5 is a block diagram depicting an exemplary embodiment of a design tool 500 for designing a memory subsystem for implementation using an FPGA. The design tool 500 comprises an input section 502 and a memory model section 504. The memory model section 504 provides a configurable and programmable memory model for implementing a memory subsystem using an FPGA and, optionally, other memories connected to an FPGA.

In particular, the input section 502 is coupled to a database that stores an API associated with the memory model, referred to herein as the memory interconnection description language (MIDL) library 506. The MIDL library 506 comprises a set of primitives for defining structural and behavioral attributes of the memory model. Thus, the MIDL library 506 provides a programming interface for the memory model. A designer may interact with the input section 502 to produce specification data for a memory subsystem. The designer may work directly with the MIDL library 506, or may work indirectly with the MIDL library 506 through an alternative design tool defined within the input section 502. The memory subsystem specification data may be programmatic or may be interpretive (e.g., XML). An example of an MIDL specification for a 32-bit wide memory constructed from two 16-bit wide memories, which are in turn mapped to physical BRAM in an FPGA, is shown in Appendix A.

The memory model section 504 is coupled to the input section 502 for receiving the memory model specification. The memory model section 504 is also coupled to a database that stores the features or attributes of the memory model ("memory model database 508"), and a database that stores the memory attributes of an FPGA and external memories associated therewith ("FPGA memory database 510"). The memory model section 504 includes a first portion 503 for generating a logical view of a memory subsystem in accordance with the memory subsystem specification. The logical view is defined in terms of the logical components of the memory model stored in the memory model database 508.

The memory model section 504 may include an analysis/optimization portion 512 for analyzing and optimizing the logical view of the memory subsystem in accordance with constraint data provided by a designer. The memory model section 504 further includes a second portion 505 for generating a physical view of the memory system based on the logical view. Notably, using information in the FPGA memory database 510, the memory model section maps the logical view of the memory subsystem onto the physical memory components associated with an FPGA. The memory model section 504 provides FPGA design data as output.

Figure 6:
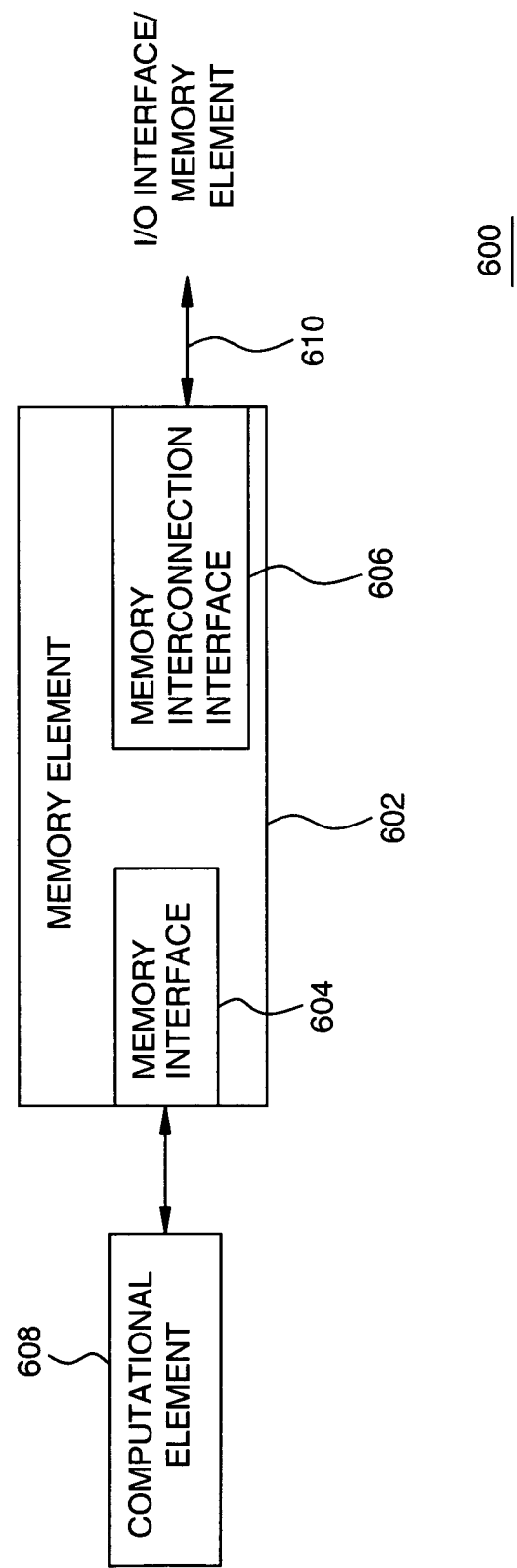
FIG. 6 is a block diagram depicting an exemplary embodiment of a memory model in accordance with one or more aspects of the invention.

FIG. 6 is a block diagram depicting an exemplary embodiment of a memory model 600 in accordance with one or more aspects of the invention. The memory model 600 comprises a memory element 602 having a memory interface 604 and a memory interconnection interface 606. The memory element 602 is a logical component with no implied physical implementation. That is, the memory element 602 may comprise one or more physical memories, disposed within an FPGA and/or external thereto. The memory interface 604 is configured to provide communication between the memory element 602 and a computational element 608 (e.g., one or more threads). For example, the memory element 602 may be configured to store messages, and the computational element may access the messages through the memory interface 604 for processing. The memory interconnection interface 606 is configured to provide communication between the memory element 602 and an interconnection 610. The interconnection 610 may comprise a portal to an I/O interface (e.g., a Gigabit Ethernet MAC core on the FPGA) or to another memory element (either within the FPGA or external to the FPGA). For example, the memory element 602 may be configured to store messages, and the interconnection may receive and transmit messages to and from the memory-interconnection interface 606.

The memory model 600 is characterized by a "memory architecture" and a "memory-interconnection architecture." The memory architecture pertains to the size, type, and topology of one or more memory circuits comprising the memory element 602. The memory-interconnection architecture pertains to the type, bus width (e.g., number of wires), and topology of interconnection (e.g., crossbar) of the one or more memory circuits comprising the memory element 602. In general, with respect to the memory model 600, the term "interface" imparts knowledge related to the protocols that must be adhered to for the particular interaction, whereas the term "architecture" imparts knowledge related to the critical path that particular data follows within the memory model 600.

The memory and interconnection architectures of the memory model 600 may be defined by the physical location of the memory circuits used to implement the model, as well as the logical configuration of the interface to such memory circuits. For example, the memory may be physically centralized (i.e., a single physical memory circuit), or several memory circuits may be physically distributed. The memory circuit(s) used to implement the memory model 600 may be disposed within the FPGA (e.g., any combination of on-chip BRAMs, LUT-based RAMs, and shift registers), disposed external to the FPGA (e.g., external SDRAMs, DDR SDRAMs, and RDRAMs), or a combination thereof. In addition, the interface to such memory circuit(s) may be logically centralized (e.g., a unified programming interface) or logically distributed (e.g., multiple logical interfaces).

In light of the various physical and logical configurations for the memory and interconnection architectures, various logical schemes for storing messages may be implemented using the memory model 600. In one embodiment, all messages may be stored within a single memory (e.g., a queue of messages in a memory) ("uniform message storage"). Alternatively, different messages may be allocated over different memories ("interleaved message storage"). In yet another alternative, each message may be physically allocated over different memories ("striped message storage"). In another embodiment, each message may be logically allocated over different memories ("separated message storage").

Figure 7:
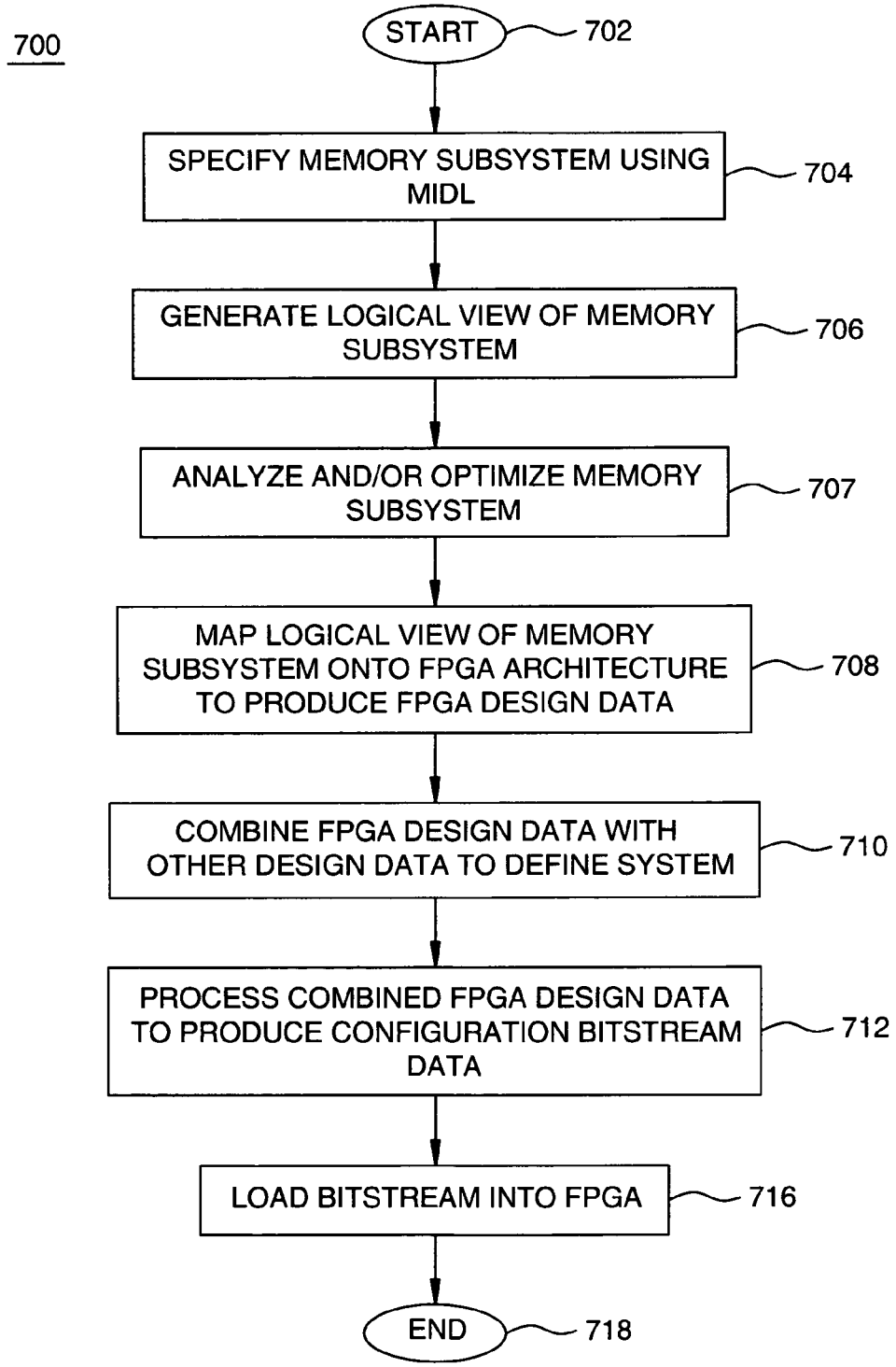
FIG. 7 is a flow diagram depicting an exemplary embodiment of a process for designing a memory subsystem for implementation using an FPGA.

FIG. 7 is a flow diagram depicting an exemplary embodiment of a process 700 for designing a memory subsystem for implementation using an FPGA. The process 700 is described with respect to the memory model 600 of FIG. 6. The process 700 begins at step 702. At step 704, a memory subsystem specification is defined using a MIDL. As described above, the MIDL comprises a set of primitives associated with the logical memory model 600. Notably, the MIDL includes primitives for defining the memory architecture, the memory-interconnection architecture, the memory interface, and the memory-interconnection interface.

At step 706, a logical view of the memory subsystem is generated in accordance with the memory subsystem specification. The logical view is defined in terms of the memory model 600. That is, the logical components of the memory model 600 are configured in accordance with the memory subsystem specification to generate a logical view of the memory subsystem.

At step 707, the memory subsystem may be analyzed and optimized in accordance with predefined constraint and test data. The constraint data may include constraints on memory access, time, and interconnect resources. The test data may include one or more test memory access patterns. In one embodiment of the invention, an analysis model based on memory access, time, and interconnect resources is employed.

Figure 8:
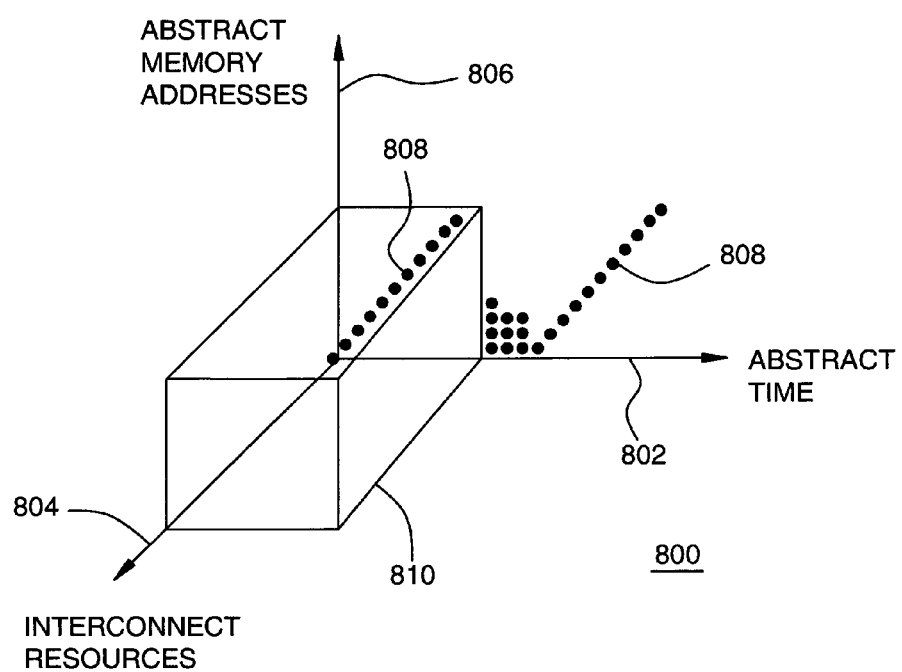
FIG. 8 is a graph illustrating an exemplary embodiment of a memory analysis model.

FIG. 8 is a graph 800 illustrating an exemplary embodiment of a memory analysis model. The graph 800 includes an axis 802 representing abstract memory addresses, an axis 804 representing abstract time, and an axis 806 representing interconnect resources. The graph 800 depicts an exemplary access pattern comprising a plurality of points 808. Each point 808 signifies a memory access corresponding to a particular memory location (address) at a particular time that utilizes a particular interconnect resource. For example, the exemplary access pattern may result from a burst of packets entering the memory subsystem, followed by some header manipulation, and a burst of packets exiting the memory subsystem. The predefined constraint data is shown superimposed over the graph 800 as a cuboid 810. If all points 808 are within the cuboid 810, the access pattern is valid. Otherwise, an optimization is required to satisfy the constraints.

Returning to FIG. 7, at step 708, the logical view of the memory subsystem is mapped onto an FPGA architecture to produce FPGA design data. That is, the logical components comprising the logical view are linked to physical memory components of an FPGA and, optionally, other memory devices connected to the FPGA. The FPGA design data provides a physical view of the specified memory subsystem in terms of the memory architecture of the FPGA. That is, FPGA design data corresponds to the physical implementation of the logical view of the memory subsystem defined using the MIDL. In one embodiment of the invention, the FPGA design data comprises an HDL representation of the MP system design.

At step 710, the FPGA design data may be combined with other FPGA design data to define a system. For example, the memory subsystem may be incorporated into an MP system designed as described above in the section entitled "SOFT PLATFORM." That is, the memory subsystem may be the implementation of the MIS component of the soft platform architecture used to implement an MP system.

At step 712, the combined FPGA design data is processed to produce configuration bitstream data. For example, if the combined FPGA design data comprises an HDL representation, the FPGA design data may be synthesized, mapped, placed, and routed in a well-known manner to produce bitstream data for configuring an FPGA. At step 716, the configuration bitstream data is loaded into an FPGA. The process 700 ends at step 718.

Multithread Model

Figure 9:
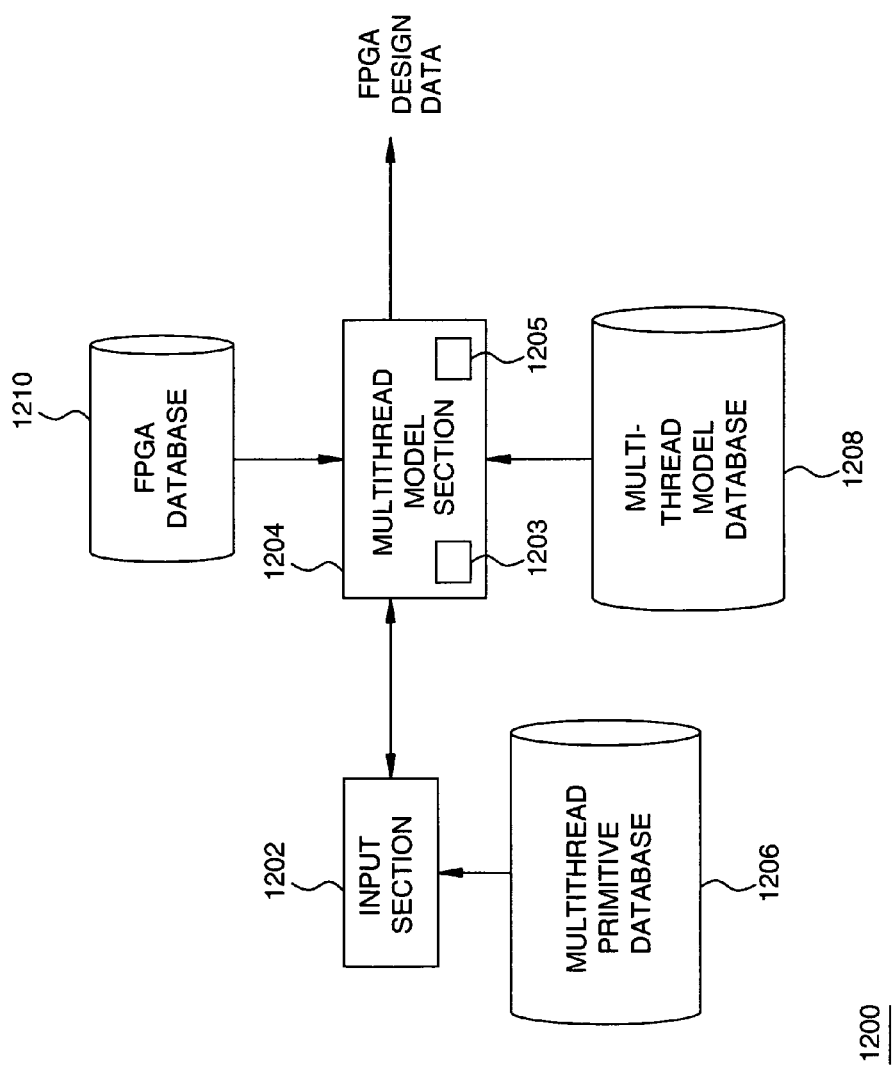
FIG. 9 is a block diagram depicting an exemplary embodiment of a design tool for designing a multithread model for implementation using an FPGA.

FIG. 9 is a block diagram depicting an exemplary embodiment of a design tool 1200 for designing a multithread model for implementation using an FPGA. The design tool 1200 comprises an input section 1202 and a multithread model section 1204. The multithread model section 1204 provides a configurable and programmable multithread model for implementing multiple threads using an FPGA. As used herein, the term "thread" is a concurrent execution unit appropriate for implementing a process, such as some of the processes described above with respect to the soft platform architecture (e.g., FOPs and PIPs). The multithread model employs a synchronization mechanism for controlling the various threads thereof and, in some embodiments, passing data therebetween.

In particular, the input section 1202 is coupled to a database that stores a library of multithreading primitives ("multithread primitive database 1206"). The multithread primitive database 1206 stores a set of primitives for defining structural and behavioral attributes of the multithread model. Thus, the multithread primitive database 1206 provides a programming interlace for the multithread model. Notably, the multithread primitive database 1206 includes primitives for starting a thread, stopping a thread, suspending a thread, as well as synchronization of such starting, stopping, and suspending among threads. In addition, primitives are provided for indicating status information for individual threads, such as completion or suspension, among other threads. Furthermore, primitives may be provided for allowing data communication among threads.

A designer may interact with the input section 1202 to produce specification data for a multithreading system. The designer may work directly with the multithread primitive database 1206, or may work indirectly with the multithread primitive database 1206 through an alternative design tool defined within the input section 1202. The multithreading system specification data may be programmatic or may be interpretive (e.g., XML).

The multithread model section 1204 is coupled to the input section 1202 for receiving the multithreading system specification data. The multithread model section 1204 is also coupled to a database that stores the features or attributes of the multithread model ("multithread model database 1208"), and a database that stores the physical attributes of an FPGA ("FPGA database 1210"). The multithread model section 1204 includes a first section 1203 for generating a logical view of the multithreading system in accordance with the multithreading system specification. The logical view is defined in terms of the logical components of the multithread model stored in the multithread database 1208. The multithread model section 1204 includes a second portion 1205 for generating a physical view of the multithreading system based on the logical view. Notably, using information in the FPGA database 1210, the multithread model section 1204 maps the logical view of the multithreading system onto the physical components associated with an FPGA. The multithread model section 1204 provides FPGA design data as output.

Figure 10:
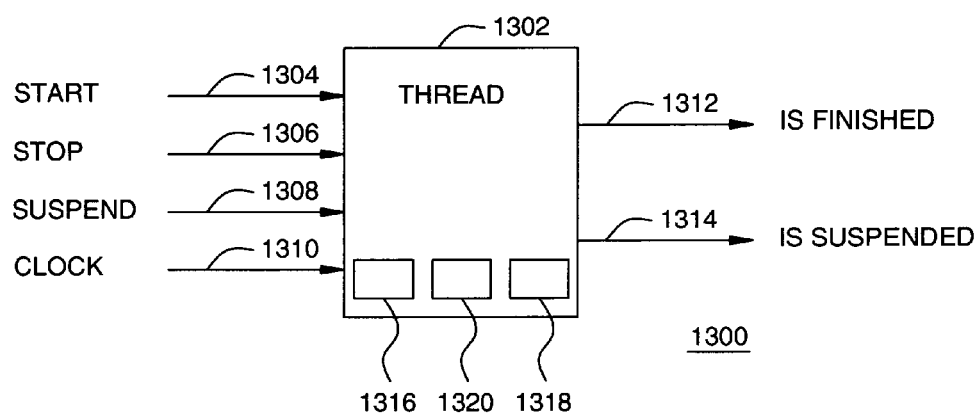
FIG. 10 is a block diagram depicting an exemplary embodiment of a thread model in accordance with one or more aspects of the invention.

FIG. 10 is a block diagram depicting an exemplary embodiment of a thread model 1300 in accordance with one or more aspects of the invention. The thread model 1300 comprises a thread 1302 having a start terminal 1304, a stop terminal 1306, a suspend terminal 1308, a clock terminal 1310, an is Finished terminal 1312, and an is Suspended terminal 1314. The start terminal 1304, the stop terminal 1306, and the suspend terminal 1308 comprise an input bus of the thread 1302 for controlling operation thereof. The is Finished terminal 1312 and the is Suspended terminal 1314 comprise an output bus of the thread 1302 for conveying status information related to the thread 1302. As described below, the output bus of the thread 1302 may include other portions for communicating signals amongst threads. The thread model 1300 is a logical component with no implied physical implementation. An example interface in VHDL for a thread is shown in Appendix B.

Notably, the thread model 1300 may be physically implemented in programmable logic of an FPGA as a synchronous FSM. That is, a clock drives the state machine's transitions and, within each state of the state machine, operations are performed on operands producing outputs. In another embodiment, the thread model 1300 may be implemented using a microcontroller embedded within an FPGA. In yet another embodiment, the thread model 1300 may be implemented using a hard or soft microprocessor embedded within an FPGA.

The thread 1302 includes control logic 1320 for processing data and producing control state data 1316 and operation state data 1318. The control state data 1316 captures the state of the thread 1302 in terms of inter-thread communication (e.g., the thread is finished or suspended). The operation state data 1318 captures the internal state of the thread 1302, which is defined in accordance with the operation of the control logic 1320.

In one embodiment of the invention, the thread 1302 includes an IDLE control state that corresponds to the thread 1302 not currently carrying out any operation. During the IDLE control state, the is Finished terminal 1312 is asserted to indicate that the thread 1302 is not doing any work. If the start terminal 1304 is asserted, the thread 1302 moves out of the IDLE control state and performs the various operations that the thread 1302 is configured to perform. The is Finished terminal 1312 is no longer asserted to indicate that the thread 1302 is in operation. Asserting the stop terminal 1306 returns the thread 1302 to the IDLE control state, terminating all operations. Asserting the suspend terminal 1308 causes the thread 1302 to remain in its current operation state, regardless of how many clock cycles occur on the clock terminal 1310. The suspend terminal 1308 may be used during debugging or testing through an external agent. The is Suspended terminal 1314 is asserted while the thread 1302 is suspended.

The operation state data 1318 depends on the operational configuration of the control logic 1320 of the thread 1302 in accordance with specification data provided by a designer. That is, the control logic 1320 of the thread 1302 is configured to execute a series of steps, where one or more operations are performed at each step. In one embodiment, the thread 1302 may be designed to have one or more designated terminal operation states that cause the thread 1302 to enter the IDLE control state and assert the is Finished terminal 1312. Alternatively, there may be no such designated terminal control states, in which case the thread is controlled externally by asserting the stop signal.

An example VHDL code fragment for implementing the thread 1302 is shown in Example 1 below.

a. update: process (clk, stopThread)
  i. begin—process update
  ii. if stopThread='1' then
    1. state<=idle;
  iii. elsif clk'event and clk='1' and suspendThread='0'
  iv. then
    1. state<=nextState;
  v. end if;
b. end process update;

Example 1

The thread 1302 is implemented as a state machine. In this example, the IDLE control state is implemented as an extra state added to the internal operation state set of the thread. While there is no explicit suspend control state, the suspend mechanism may be implemented by driving the suspend terminal 1308 to prevent the calculated nextState from being latched into the state machine's register. Thus, the thread will remain in the current operation state, with no forward progress. For purposes of clarity by example, the implications for the values of outputs from the state are not shown explicitly in the above exemplary VHDL code fragment.

The thread 1302 has thus far been described with respect to an external agent that asserts the start, stop, and suspend terminals. The "external agent" may be another thread, thus allowing threads to control other threads. In order to enable one thread to write or read the signals of another thread, the multithread model employs an interconnection topology and an addressing mechanism. That is, a plurality of threads are interconnected for communication amongst themselves, and a thread may associate the address of another thread with its collection of input and output signals.

Figure 11:
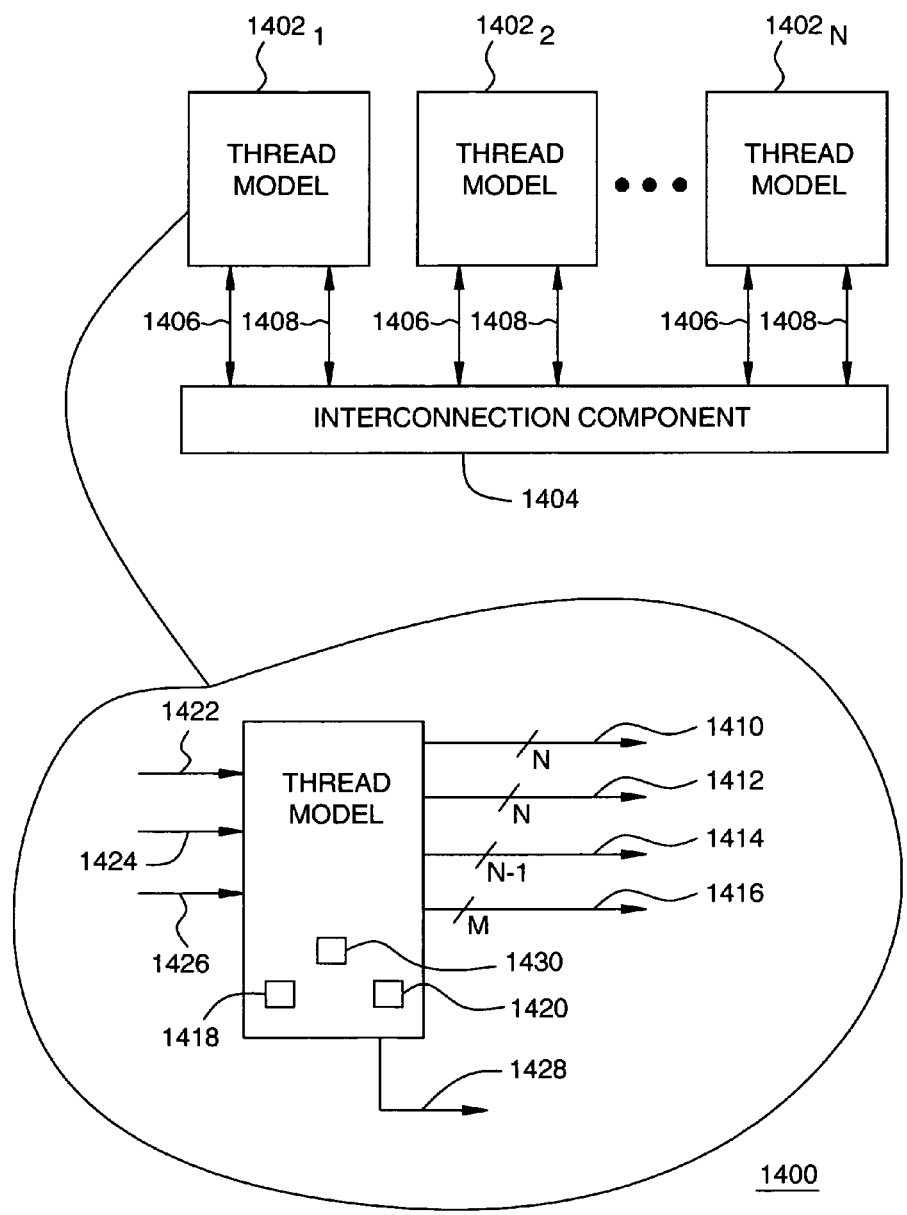
FIG. 11 is a block diagram depicting an exemplary embodiment of a multithread model in accordance with one or more aspects of the invention.

FIG. 11 is a block diagram depicting an exemplary embodiment of a multithread model 1400 in accordance with one or more aspects of the invention. The multithread model 1400 comprises a set of thread models $1402_1$ through $1402_N$, where N is an integer greater than one (collectively referred to as thread models 1402). The multithread model 1400 also includes an interconnection component 1404. Each of the thread models 1402 includes an input bus 1406 and an output bus 1408. The input bus 1406 and the output bus 1408 of each of the thread models 1402 are in communication with the interconnection component 1404. In one embodiment, the interconnection component 1404 facilitates complete point-to-point communication of control, status, and/or data among the thread models 1402.

In one embodiment of the invention, the output bus 1408 of a thread model 1402 comprises a start control bus 1410, a stop control bus 1412, a suspend control bus 1414, and a status bus 1416. The width of each of the start control bus 1410 and the stop control bus 1412 is N (i.e., the number of thread models 1402 in the multithread model 1400). The width of the suspend control bus 1414 may be N−1 if self-suspension of a thread is not defined. The status bus 1416 may comprise M status signals (e.g., is Finished and is Suspended signals) and thus the width of the status bus 1416 is M. The input bus 1406 of a thread model 1406 comprises a start terminal 1422, a stop terminal 1424, and a suspend terminal 1426.

Each of the thread models 1402 may generate a control signal for each of the other thread models 1402 (e.g., thread model $1402_1$ produces control signals for thread models $1402_2$ through $1402_N$) through operation of control logic 1430 depending on the particular application. Thus, if there are eight thread models 1402 in the multithread model 1400, then each thread model 1402 will produce eight start signals, eight stop signals, and seven suspend signals in accordance with the control logic 1430. For each of the thread models 1402, start signal and one stop signal is connected in a self-loop, which allows a thread model 1402 to start and stop itself. The interconnection component 1404 facilitates the connection between the output bus 1408 of a given thread model and the input buses of each of the other thread models.

Figure 12:
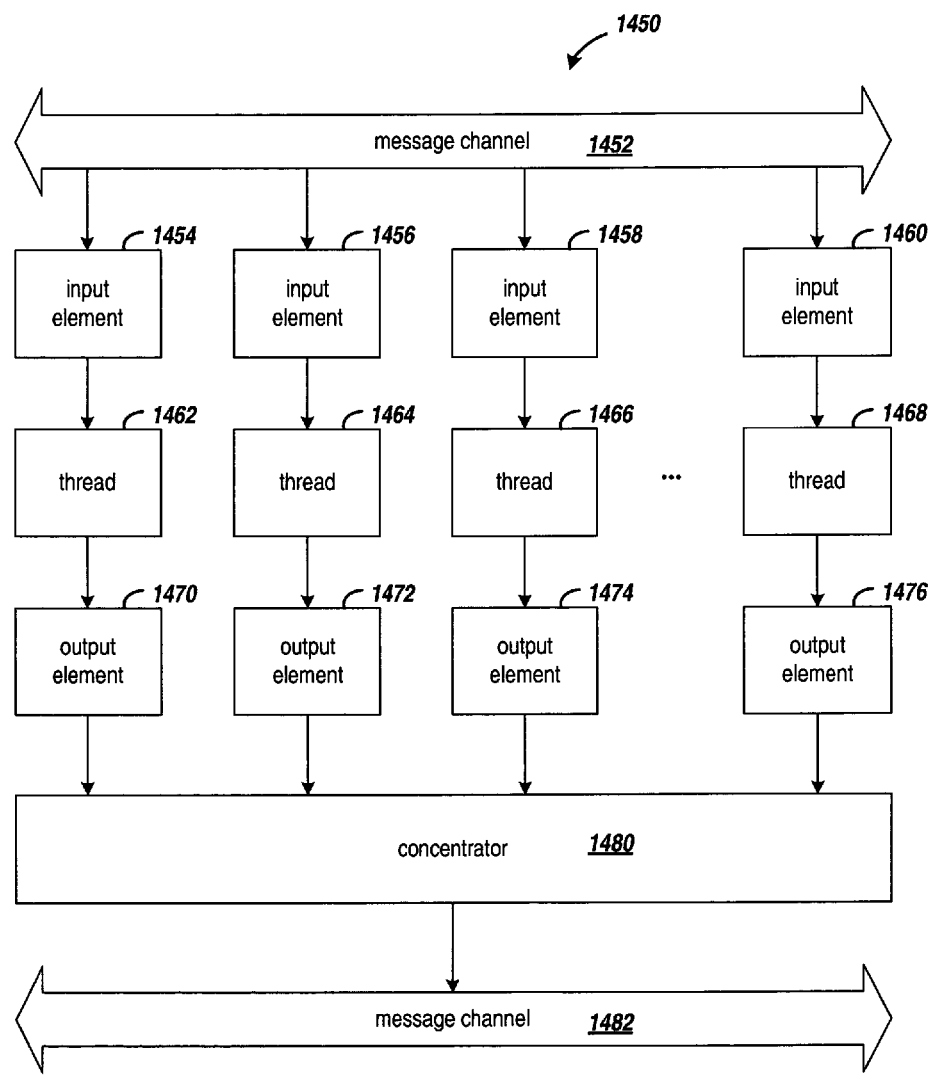
FIG. 12 is a block diagram of an example circuit arrangement for processing input messages in accordance with various embodiments of the invention.

FIG. 12 is a block diagram of an example circuit arrangement 1450 for processing input messages in accordance with various embodiments of the invention. The arrangement 1450 includes a message channel 1452, multiple input elements 1454, 1456, 1458, and 1460 that are respectively coupled to multiple threads 1462, 1464, 1466, and 1468, and multiple output elements 1470, 1472, 1474, and 1476 that are respectively coupled to the threads. The arrangement further includes a concentrator 1480 that is coupled to the output elements. The concentrator is also coupled to message channel 1482, which may be the same channel as message channel 1452 depending on application requirements.

A message broadcast on message channel 1452 may be processed in parallel by threads 1462, 1464, 1466, and 1468. A message is presented on message channel 1452 by a broadcast component (not shown), for example. The broadcast component transmits on the message channel 1452, data words from the message along with addresses that indicate the message relative position of the data. Each of the input elements is configured to extract from the broadcasted data, that data needed by the coupled thread. For each input element, the definition of the message format and the data required by the associated thread are used to configure the function of the input element to capture the required part(s) of the message.

The threads 1462, 1464, 1466, and 1468 perform their respective application-specific processing on the parts of the message provided by the input elements. An example application is an implementation for remote procedure calls (RPC) in which a first thread performs Ethernet protocol processing, a second thread performs Internet Protocol (IP) protocol processing, a third thread performs User Datagram Protocol (UDP) processing, and a fourth thread performs RPC processing. The output data from the threads is provided to output elements 1470, 1472, 1474, and 1476, and the output elements provide temporary storage for the data, which is read and assembled by concentrator 1480. The concentrator assembles the data in the proper order as defined by application requirements and transmits the message on message channel 1482. Message channels 1452 and 1482 may be any implementation-suitable communications channel.

Control signals (not shown) are application-dependent. For example, there may be control signals from the input elements to the respective threads, control signals between the threads, and control signals from the threads to the concentrator.

The input elements may use registers local to the threads to store the input data. In another embodiment, on-chip BRAM or off-chip RAM dedicated to each input element may be used for storing message data. RAM storage permits storage of large amounts of data. In another embodiment, RAM integrated with an embedded processor may be used to store the required message data. Depending on application requirements and implementation restrictions, various combinations of registers, RAM, or processor memory may be used. Dedicated message storage for each of the input elements removes the need for the threads to arbitrate for access to message data and allows the threads to process the respective subsets of the message in parallel.

The output elements 1470, 1472, 1474, and 1476 may also be implemented using local registers, BRAM, RAM, or processor RAM as described above for the input elements. Each of the threads writes to the storage in the output element its portion of data required for a complete output message. The concentrator 1480 reads from the output elements the data required for an output message and packs the data according to the definition of the message format.

The particular approach selected for storage of input data and output data may be affected by the selected implementation for the threads. For example, if a thread is implemented in configurable logic of an FPGA, BRAM may be the suitable choice for storage of input and output data. A processor-based implementation of a thread may indicate that processor registers or processor RAM are desirable for storage of the input and output data.

For some messages there may be constant values in the message header. Since the values are constant, there is no need for these values to be written to and occupy storage space of the output elements. Thus, in one embodiment the concentrator is configured to merge the constant values with data read from the output elements into the outgoing message. This removes the need for storing an entire input message for the threads since the constant values are handled by the concentrator.

Some words of the output message may be affected by multiple threads. For example, checksums may be performed over multiple words of headers for some applications. Since checksums may be updated rather than recalculated from scratch, the incoming checksum for a message header may be modified by the threads. Thus, depending on the application, some inter-thread communication may be required to maintain coherency between the field(s) of the message updated by the various threads.

In various embodiments of the invention, the input elements, output elements, and concentrator are automatically generated based on high-level programmatic specification of the threads. For example, in a C language specification of a thread, any variable that appears on the right side of an assignment statement or in the conditional test of a loop is a required input to the thread. Similarly, any variable that appears on the left side of an assignment statement is an output. Local variables that preserve state between runs of the thread are also identifiable from the semantics of the program code.

In an example application such as processing of network messages, the inputs and outputs are the fields in the message (e.g., an IP address). Since the format for these messages is well defined, the positions of the fields in the input message and the positions for data in an output message are identifiable from the message definition. Thus, from the source code specification of the thread and the definition of the message format, the input elements, output elements, and concentrator may be automatically generated.

Figure 13:
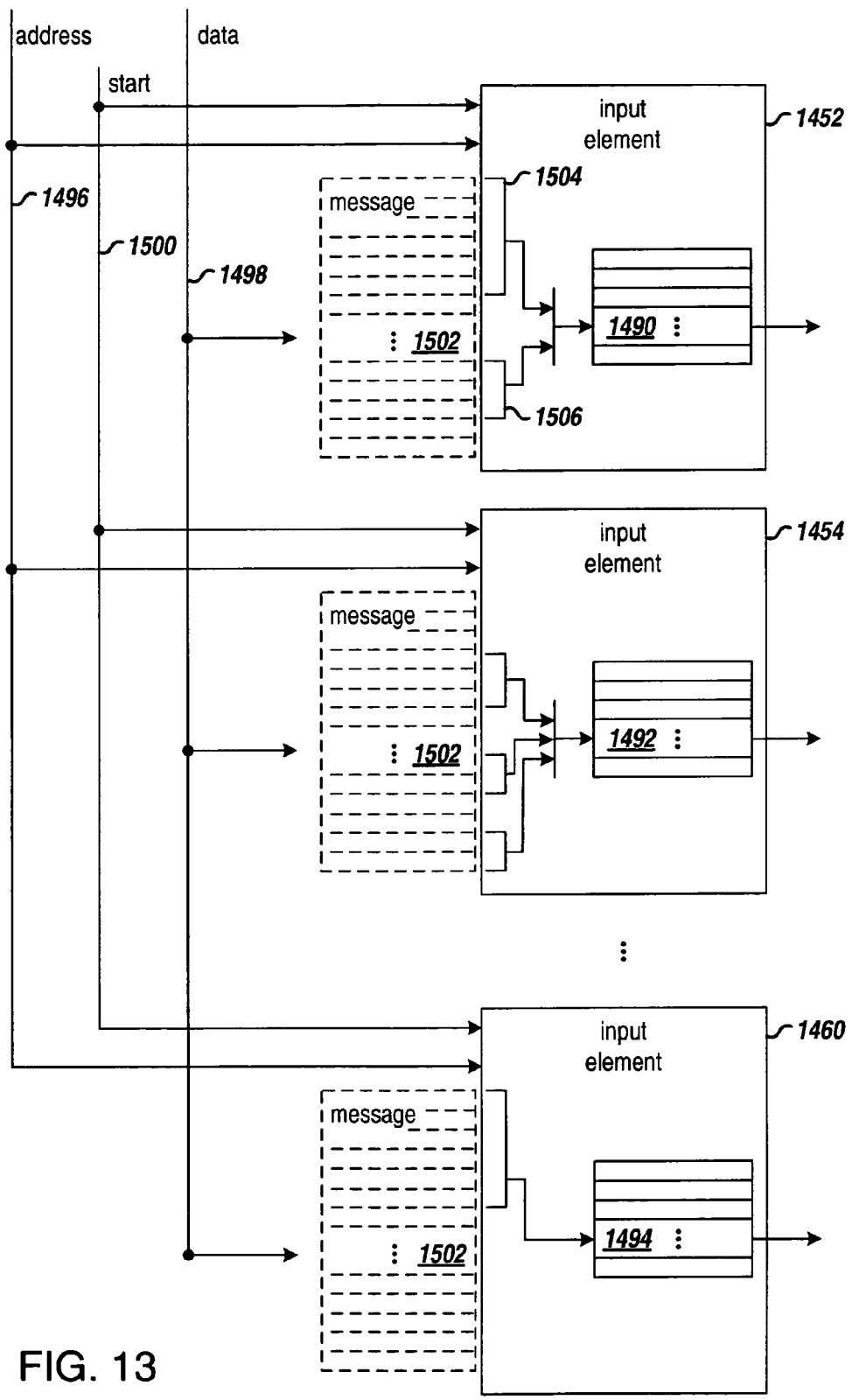
FIG. 13 is a block diagram that illustrates the selection of different portions of an input message by multiple input elements.

FIG. 13 is a block diagram that illustrates the selection of different portions of an input message by multiple input elements (e.g., 1454, 1456, and 1460). Each of the input elements has storage for a subset of data from a message. The storage in the input elements is illustrated as blocks 1490, 1492, and 1494, respectively. As explained above, the storage may be register-based, BRAM, or RAM depending on implementation requirements.

The message channel includes signals lines 1496, 1498, and 1500 for indicating a message-relative address (line 1496) of data present on the data line 1498 and for indicating the start of a message (line 1500).

The instances of block 1502 represent the message as broadcast to the input elements on the data line. The complete message is shown in block 1502 for purposes of showing that the different input elements may select different subsets of data from the message. Those skilled in the art will recognize that in most applications the complete message would not be present at one time at the data input port of the input element even though the complete message is illustrated.

Each of the input elements implements logic that captures from a message on the message channel the subset of data required by the coupled thread. The logic is responsive to the address on line 1496 and the start signal on line 1500. For example, input element 1454 selects from the message 1502 the subset of data indicated by brackets 1504 and 1506. The address on the address line indicates to the input element when the message data indicated by the brackets is present on the data line. Input elements 1456 and 1460 show the selection and storage of different subsets of data from the message. The storage for the selected subset of message data (e.g., 1490) is readable by the coupled thread.

Figure 14:
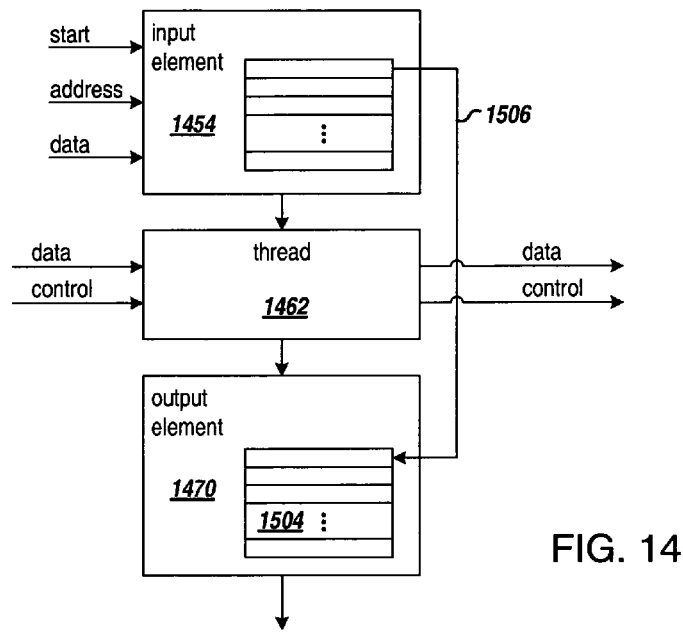
FIG. 14 is a block diagram that illustrates the coupling of an input element to an output element in an example application in which part of the output message is a copy or a straightforward translation of a part of the input message.

FIG. 14 is a block diagram that illustrates the coupling of the input element 1454 to the output element 1470 in an example application in which part of the output message is a copy or a simple translation of a part of the input message. The output element includes memory/registers 1504 to which the thread 1462 writes output data that is to be included in an output message.

In some applications, a portion of the output message may be a direct copy or simple translation of a portion of the input message. In one embodiment, the output element is coupled to the input element (line 1506), and the output element copies/translates one or more data values from the input message to a storage cell in the output element. Whether the value is copied or translated may be determined from the source code specification of the thread. The position of the copied/translated value in the output storage block 1504 may be determined from the definition of the output message format.

Depending on the application, data may be transmitted between threads and one or more of the threads may drive control signals to one or more others of the threads. Thread 1462, for example, is shown both as receiving data and a control signal another thread and providing data and a control signal to another thread.

Figure 15:
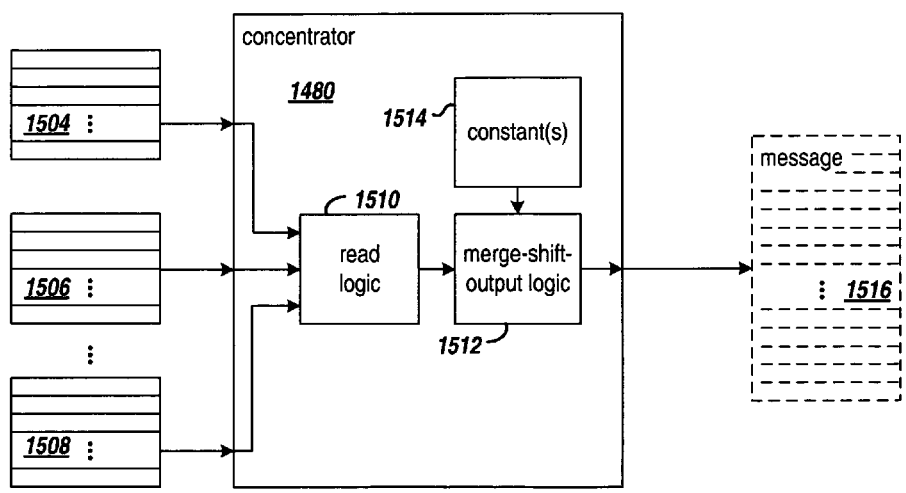
FIG. 15 is a block diagram of an example concentrator.

FIG. 15 is a block diagram of an example concentrator 1480. Generally, the concentrator assembles data for an output message from data in the storage blocks 1504, 1506, and 1508 of the output elements. Data is read from the storage blocks, merged with any constant values identified from the thread specification or message definition, and shifted if necessary for proper alignment with words of the output message.

The read logic 1510 reads data from the storage blocks of the output elements in the order designated by the application-specific definition of the output message. The data is provided to the merge-shift-output logic 1512 in the designated order. The merge-shift-output logic combines data read from the storage blocks 1504, 1506, and 1508 with any constant values 1514 determined from the thread specification. In addition, since the data from the output elements may not be in the correct bit location for the outgoing word, data values may need to be shifted. For example, suppose the outgoing word should be the 32-bit word A B C D where A, B, C and D are all 8 bits. If each of the threads outputs a 32-bit word, thread 1 produces A, thread 2 produces B and so on, the 32 bit word output from thread 1 is 000A, the 32 bit word output from thread 2 is 000B and so on. The relevant parts of the read words will need shifting (by known amounts) to produce the required outgoing word, ABCD. The message data, collectively illustrated as block 1516, is output on the message channel (FIG. 12, 1482).

FIG. 16 is a flowchart of a process for generating a system for multi-thread processing of messages in accordance with various embodiments of the invention. To construct the input elements for the threads, the respective portions of an input message required by the threads is determined from the specifications of the threads (step 1520). As described above, variables on the right side of statements and variables used in conditional tests as specified in program code that defines a thread, may be used to identify the portions or "fields" of the message required by the thread.

The locations of the required portions of the message may be determined from a specification of the message format (step 1522). The message specification may be provided as input to the process or may be hard-coded as part of an executable program for generating the system.

For each thread, an input element is generated based on the required portion(s) of the message and the address(es) of the required portion(s) (step 1524). The generated input thread includes storage for the required portion(s) of the message and logic for reading the required portion(s) from the message channel and storing the data in the input element's storage. The specification of the input element may be in a format suitable for the target implementation. For example, if an FPGA is targeted for hosting an input element, the specification may be in a hardware description language (HDL). The specification of the input element may be further processed using the appropriate tools to obtain a configuration bitstream or executable code to realize an implementation of the input element.

An output element is also automatically generated based on a thread specification. From the thread specification, the parts of the output message provided by the thread are determined (step 1526). As described above, variables on the left side of assignment statements may be part of the output message. The process may recognize that for one or more parts of the output message, the value in the output message is a copy or a straightforward translation of a value stored in the input element.

An output element is generated for each thread using the identified parts of the output message provided by the thread and any copies or translations of input values (step 1528). The output element includes storage for the data output by the thread along with storage for one or more values that are copies or simple translations of values from the input element. Example simple translations include incrementing and decrementing by a fixed value. The output element is also generated to include logic for reading/translating any values copied or translated from the input element. As with the input element, the generating of the output element may entail generating a specification of the output element in an implementation-suitable format, followed by further processing to obtain a realization of the implementation.

The concentrator may also be automatically generated from the thread specification and the specification of the output message. Any constants output by the thread are determined (step 1530). The constant values may be hard-coded into the specification of the concentrator. The specification of the output message indicates the order in which data values in the output elements and the constant values are to be assembled for the output message. With the identified constants and data ordering of the output message, the concentrator can be generated (step 1532). The concentrator reads data from the output elements in the required order, merges constant values as appropriate, and performs any required data shifting.

In one embodiment, the thread specification and the specifications of the input message and output message may be input as data files to a tool that performs the processing described above. The tool may be implemented in software and perform the process steps without manual intervention.

The code in Example 2 below illustrates a programmatic specification of a system from which an example input element may be automatically generated.

```
IF (ETH.L/T !=0x8000) DROP
IF (ETH.DST_ADDR !=LOCAL_MAC_ADDR) DROP
ETH.SRC_ADDR'=ETH.DST_ADDR
ETH.DST_ADDR'=ETH.SRC_ADDR
ETH.L/T'=0x8000
IF (IP.PROTOCOL !=(0x11 or 0x01)) DROP
IF (IP.DST_ADDR'=LOCAL_JP_ADDR) DROP
IP.SRC_ADDR'=LOCAL IP
IP.DST_ADDR'=IP.SRC_ADDR
IP.CHECKSUM'=
   NOT(0x5911+IP.SRC_ADDR(31..16)+IP.SRC_ADDR
   (15..0)+IP.DST_ADDR(31..16)+IP.DST_ADDR
   (15..0)+(RPC_LENGTH or ICMP_LENGTH)
IP.TOTAL_LENGTH'=IP.TOTAL_LENGTH+((RP-
   C_LENGTH+8) or ICMP_LENGTH)
UDP.CHECKSUM'=UDP.SRC_PORT+UDP.DST_
   PORT+OUTPUT_LENGTH
UDP.LENGTH'=OUTPUT_LENGTH+8
   UDP.DST_PORT'=UDP.SRC_PORT
   UDP.SRC_PORT'=UDP.DST_PORT
IF (RPC.PORT=111) {
IF (RPC.PROCEDURE=3) (
IF (RPC.PROGRAM=23451111) {
   RPC.RESULT'=10987
   RPC.OUTLEN'=28
   RPC_LENGTH'=32
}
ELSE DROP
}
ELSE DROP
}
ELSE DROP
IF (ICMP.TYPE !=ICMP.PING_REQUEST) DROP;
ICMP.TYPE'=0
ICMP.CHECKSUM'=ICMP.CHECKSUM>=0xF7FF   ?
   ICMP.CHECKSUM-0xF7FF:ICMP.CHECKSUM+
   0x0800 ICMP_LENGTH=some fixed number
```

Example 2

From this code, an automated, processor-based method may recognize that there are 5 threads: Ethernet, IP, UDP, RPC, and ICMP. Thus, 5 input elements are identified.

The allowable packets include:

ETH IP UDP RPC->ETH IP UDP RPC or drop

ETH IP ICMP->ETH IP ICMP or drop

The left side of the "->" is the input packet format (e.g., Ethernet followed by IP followed by UDP followed by RPC) and the right side is the possible output packet formats (e.g., the same format as the input or a drop). Depending on the application the output packet format may be different from the input packet format.

With the 5 identified threads, the function of the concentrator may be determined from the following Table 1 generated from the system specification:

TABLE 1

| Eth | IP | UDP | RPC | ICMP | Output |
|---|---|---|---|---|---|
| D | * | * | * | * | D |
| * | D | * | * | * | D |
| NOT DROP | NOT DROP | + | + | * | RPC |
| NOT DROP | NOT DROP | * | * | + | ICMP |

"+" indicates satisfied
"D" indicates drop
"*" indicates don't care

The Output column shows the output of the concentrator based on the conditions specified in the other columns (Eth, IP, UDP, RPC, and ICMP). Three output formats are possible—drop, an RPC packet, or an ICMP packet. The information in the table specifies the schedule for reading by the concentrator. The first two lines give the condition for drop. The third line indicates that if the UDP and RPC threads signal satisfactory completion, then the concentrator reads output from the ETH, IP, UDP, and RPC threads to produce the output RPC packet. The fourth line indicates that if the ICMP thread signals satisfactory completion, then the concentrator reads output from the ETH, IP, and ICMP threads to produce the ICMP packet.

The 5 input elements are generated with storage for the data of an input message:
ETH: ETH.DST_ADDR, ETH.L/T
IP: IP.PROTOCOL, IP.DST_ADDR, IP.SRC_ADDR, IP.TOTAL_LENGTH
UDP: UDP.SRC_PORT, UDP.DST_PORT
RPC: RPC.PORT, RPC.PROCEDURE, RPC.PROGRAM
ICMP: ICMP.TYPE, ICMP.CHECKSUM The definition of respective output elements for the different threads may also be determined from the programmatic specification of the system. For example, in the system set forth in the code of Example 2 above, the outputs produced by each thread are designated by the prime notation (for example IP.DST_ADDR'). The concentrator is configured to read each of these outputs in the order specified by the particular protocol being handled and to interleave constants or fields from the incoming packet for fields which are not affected by the thread.

FIG. 17 is a flowchart of a process for processing input messages by multiple threads in accordance with various embodiments of the invention. Each of the input elements receives data of an input message from the message channel (step 1540). Each input element decides whether the message data currently on the message channel is required by the respectively coupled thread, and in response to required data being present on the channel selects the data for storage in the input element (step 1542).

Each thread, at an application-appointed time, begins processing the portion of the message selected and stored by the respectively coupled input element (step 1544). The processing performed on the data by the threads may be performed in parallel with application-specific control between the threads as may be needed. While the threads are processing and if there is any data from the input element to be copied/translated to the output element, that data is copied (step 1546).

Data for an output message is written by each thread to the storage provided by an output element (step 1548). The concentrator reads data from the output elements and assembles and output message from the data along with any constants (step 1550).

In another embodiment, the message definition is in the form of a data structure specification in a high-level programming language, and individual versions of the data structure are created for use with each of the different threads. Each version of the data structure contains only those variables accessed by the thread for which the version was created. Thus, each thread may be compiled with only those part(s) of the data structure that are needed thereby avoiding unnecessary allocation of memory for unused parts of the data structure.

An example message definition is for a network packet. The data structure describes a generic packet, and the fields of the structure define the fields in the packet. For example, the fields in an IP packet include the IP source address, the IP destination address, version, header length, a checksum, application data, and other protocol-specific information.

FIG. 18 is a flowchart of a process for converting a common data structure into individual data structures for use by multiple threads operating from separate memories and processors. The illustrated process may be implemented as a software tool whose input is the source code for the threads, for example, and may be part of a suite of compilation tools.

The process proceeds by determining for each thread, those variables of a data structure that are accessed by the thread (step 1560). The code in Example 3 shows an example data structure used by each of a plurality of threads.

```
typedef struct {
    int x;
    int y;
    int z;
} example_data_structure;
```

Example 3

The example_data_structure may be shared by the threads by way of a header file specified in the source code of each of the threads. The source code of each thread may be processed to identify the variable(s) of the data structure referenced by thread and the variable(s) of the data structure not referenced by the thread. For example, *ds may be a pointer to the example_data_structure, with the source code for thread A having the reference:
if (ds->x==3) { ... }
the source code for thread B having the reference:
if (ds->y==3) ( ... )
and the source code for thread C having the reference:
if (ds->z==3) { ... }
Assuming that thread A references neither ds->y nor ds->z, thread B references neither ds->x nor ds->z, and thread C references neither ds->x nor ds->y, then the specification of the data structure for a thread may be changed to include only the variables referenced by that thread. The process creates for each thread, a version of the data structure having only those variables accessed by the thread (step 1562), and each version of the data structure may be written to a respective header file to be included in the source code for the thread (step 1564).

Example 4 shows the different versions of the example_data_structure.

```
/* header_a.h for thread A
typedef struct {
    int x;
} example_data_structure;
/* header_b.h for thread B
typedef struct {
    int y;
} example_data_structure;
/* header_c.h for thread C
typedef struct {
    int z;
} example_data_structure;
```

Example 3

The headers files with the customized versions of the data structures may then be included in the source code of respective threads (step 1566). If another header file has the original version of the data structure, that original header file may be edited to remove the original definition of the data structure. The source code of the threads may then be compiled to generate the executable code for the different threads (step 1568).

Those skilled in the art will recognize that the example_data_structure and example references to the data structure by threads A, B, and C are simplified for purposes of illustration. An actual application data structure would likely have one or more of the variables that are referenced by multiple threads, and each of multiple threads may reference multiple variables in the data structure.

Figure 19:
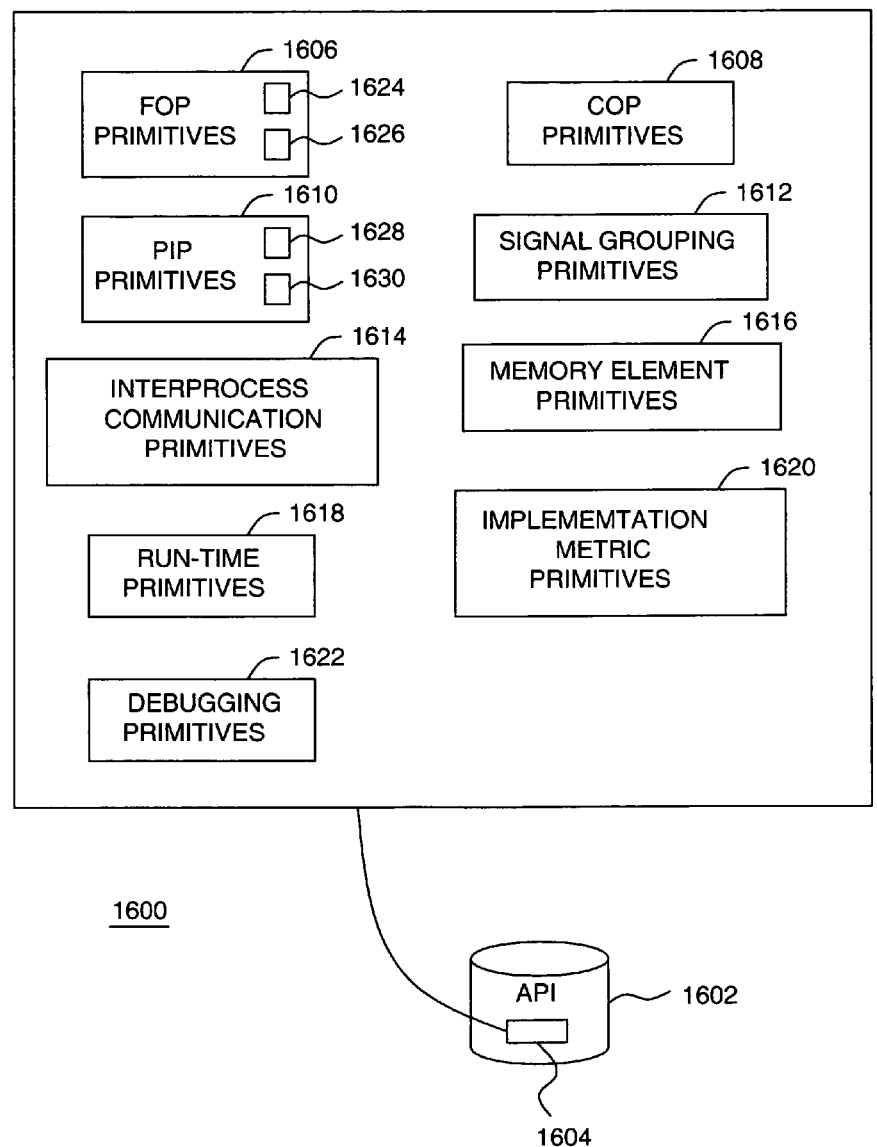
FIG. 19 is a block diagram depicting an exemplary embodiment of a programming interface for the soft platform architecture described herein.

FIG. 19 is a block diagram depicting an exemplary embodiment of a programming interface 1600 for the soft platform architecture described above. The programming interface 1600 comprises an API 1602. The API 1602 comprises a set of primitives 1604 for configuring the soft platform architecture in accordance with a design specification. In one embodiment, the primitives of the API 1602 are programming instructions or program code (e.g., function calls) for interacting programmatically with the soft platform architecture. In another embodiment, the primitives of the API 1602 are interpretive instructions that may be interpreted by the soft platform architecture. For example, a textual representation may be used to convey the design specification data to the soft platform architecture, such as XML. As is well-known in the art, XML exhibits a standardized format and a number of available parsers. The document type definition (DTD) is a formal grammar to specify the structure and permissible values in the XML document. Thus, the API 1602 may include a defined DTD that is specific to the various programmable features of the soft platform architecture.

In one embodiment of the invention, the set of primitives 1604 comprises FOP primitives 1606, COP primitives 1608, PIP primitives 1610, signal grouping primitives 1612, inter-process communication primitives 1614, memory element primitives 1616, run-time primitives 1618, implementation metric primitives 1620, and debugging primitives 1622. Each of the aforementioned primitives is discussed in detail below.

The FOP primitives 1606 provide a coding environment targeting multiple threads that operate in parallel. The FOP primitives 1606 include instruction set primitives 1624 and physical implementation primitives 1626. The instruction set primitives 1624 are used to program the threads. That is, the instruction set primitives 1624 provide a mechanism for establishing an instruction set of a thread, where the instruction set itself is programmable. Thus, a designer may modify an instruction set for a thread as desired (e.g., providing a domain-specific set of instructions). The physical implementation primitives 1626 are used to define the physical implementation of a given thread. For example, a thread may be implemented in programmable logic of an FPGA or in a hard or soft microprocessor or using a microcontroller.

In one embodiment, each thread is implemented as a custom FSM in programmable logic of an FPGA. An instruction set is defined for the FSM thread, where each instruction has a dedicated implementation. There is no additional support required for unused operations in the instruction set and multiple instructions may be executed simultaneously.

The COP primitives 1608 are used to include a function block into the design. In one embodiment, the COP primitives 1608 comprise "include" type primitives for specifying a particular function block to include within the design.

The PIP primitives 1610 may comprise instruction set primitives 1628 and physical implementation primitives 1630. The instruction set primitives 1628 are used to define an instruction set for a thread in a similar manner to the FOP primitives 1606 described above. Unlike the FOP primitives 1606, however, the instruction set primitives 1628 may be used to define certain system instructions. The system instructions are used to communicate with input/output interface logic blocks that communication with another system (within the FPGA or external thereto). For example, an interface logic block may be a gigabit Ethernet MAC core. The instruction set primitives 1628 provide support for different communication protocols to read/write data over various interfaces. For example, one type of interface may be completely streaming, with data arriving at every clock cycle. Another type of interface may have flow control, where there may be a pause in the data stream.

The physical implementation primitives 1630 define the physical implementation of the PIP (e.g., FSM, microprocessor). The PIP primitives 1610 may also comprise include type primitives for specifying the inclusion of the interface function block. Each interface block may have multiple ports, or groups of signals, associated therewith. One group of signals contains the connectivity to the external environment. The others connect to one or more PIP threads. For example, an interface block may have a set of signals that form a receive port and another set of signals that form a transmit port. In this case, the signals may be grouped together such that each port is assigned to a different PIP thread.

The signal grouping primitives 1612 are used to define signal groups. Grouping of signals may occur in various contexts, such as when connecting an interface block to a PIP thread, as described above, or when connecting to a memory element. In such cases, the programming information for an element such as a FOP thread states that the FOP thread is connected to another element.

The inter-process communication primitives 1614 provide support for synchronization and data communication between threads. Some basic aspects of the mechanism, such as support for starting, stopping, and suspending processes, may be built into the soft platform architecture. Thread synchronization and data communication, however, may be completely specified by a designer. In one embodiment, connections are explicitly specified between processes. Alternatively, required connections may be inferred from the operations defined for a particular group of processes. For example, an operation to start another process may have the form of "START(process)" or an operation to pass a data value to another process may have the form of "PASS(data, destination process)." With such an operation, a connection may be inferred without a designer explicitly defining the connection.

The memory element primitives 1616 are used to define the various types, sizes, and interconnections of memory elements. The memory element primitives 1616 may include the MIDL primitives discussed above in the section entitled "MEMORY MODEL," for specifying the logical view of a memory subsystem.

The run-time primitives 1618 may be used to apply run-time reconfiguration. Run-time reconfiguration involves the modification of a circuit implemented within an FPGA at run-time. Dynamic reconfiguration for an FPGA is well-known in the art. For example, the run-time primitives 1614 may be used to migrate functionality between programmable logic and an embedded processor. Initially, some functionality is implemented in programmable logic with other functionality implemented using an embedded microprocessor. Implicitly, the programmable logic implementation exhibits higher performance than the processor implementation. Functionality may be offloaded to the processor to save area within the programmable logic. During execution, statistics may be taken to give feedback on the chosen partition. A reconfiguration controller determines a new partition and reconfigures the FPGA. An exemplary decision condition would be based on the frequency of events. More frequency events may thus be handled in programmable logic, with less frequency events handled by the embedded processor.

The implementation metric primitives 1620 may be used to define the requirements of the system. For example, the implementation metric primitives 1620 may be used to establish performance requirements that must be met. The implementation metric primitives 1620 may be used to create constraints files (e.g., timing constraint files) that can be used by FPGA design tools (e.g., map/place/route tools). The implementation metric primitives may also provide low-level optimizations (e.g., clock frequency requirements, throughput latency requirements), as well as high-level optimizations (e.g., optimize for area, throughput, latency, power, and the like).

The debugging primitives 1622 may be used to provide debugging capabilities. The debugging primitives 1622 may be used to capture simulated data associated with the soft platform architecture. For example, instead of presenting signal waveforms to the designer, the debugging primitives 1622 allow for data presentation in a more abstracted form. The debugging primitives 1622 also provide lower-level functions through the use of tags or commands that cause the circuitry to be modified and operate in a debug mode.

Figure 20:
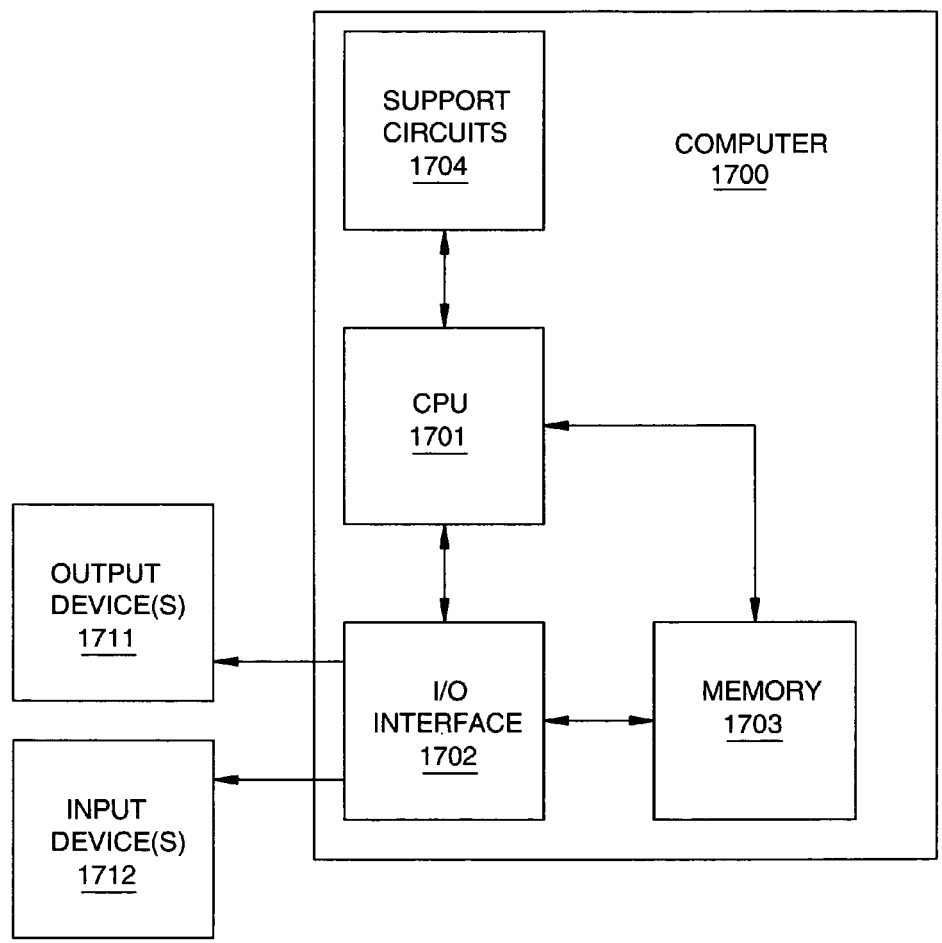
FIG. 20 is a block diagram depicting an exemplary embodiment of a computer suitable for implementing processes, methods, and system sections described herein.

One or more aspects of the invention include design tools for designing MP systems, memory systems, and multi-threading systems. Such design tools may be implemented using a computer. FIG. 20 is a block diagram depicting an exemplary embodiment of a computer 1700 suitable for implementing processes, methods, and design tool sections described herein. The computer 1700 includes a central processing unit (CPU) 1701, a memory 1703, various support circuits 1704, and an I/O interface 1702. The CPU 1701 may be any type of microprocessor known in the art. The support circuits 1704 for the CPU 1701 include conventional cache, power supplies, clock circuits, data registers, I/O interfaces, and the like. The I/O interface 1702 may be directly coupled to the memory 1703 or coupled through the CPU 1701. The I/O interface 1702 may be coupled to various input devices 1712 and output devices 1711, such as a conventional keyboard, mouse, printer, display, and the like.

The memory 1703 may store all or portions of one or more programs and/or data to implement the processes, methods, and design tool sections described herein. Although one or more aspects of the invention are disclosed as being implemented as a computer executing a software program, those skilled in the art will appreciate that the invention may be implemented in hardware or a combination of hardware and software. Such implementations may include a number of processors independently executing various programs and dedicated hardware, such as ASICs.

The computer 1700 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 1703. The memory 1703 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

APPENDIX A

COPYRIGHT XILINX, INC, 2005
MEMORY top
{
  ARCHITECTURE
  {
  CONNECT MEMINTERFACE (Mem1), MEMICINTERFACE (top);
  CONNECT MEMINTERFACE (Mem2), MEMICINTERFACE (top);
  }
MEMINTERFACE
  {
  PORT E(RW, 32);
  CONTROL { };
  }
  MEMICINTERFACE
  {
  PORT C(RW, 16);
  PORT D(RW, 16);
  CONTROL { };
  }
  MEMORY Mem1
  {
  ARCHITECTURE
  {
TYPE BRAM;
  SIZE 18K;
}
  MEMINTERFACE
  {
    PORT A(RW, 16);
    CONTROL { };
  }
  MEMICINTERFACE
  {
  }
  }
  MEMORY Mem2
  {
  ARCHITECTURE
  {
    TYPE BRAM;

```
    SIZE 18K;
}
MEMINTERFACE
{
    PORT B(RW, 16);
    CONTROL { };
}
MEMICINTERFACE
{
}
}
}
```

APPENDIX B

COPYRIGHT XILINX, INC, 2005
```
entity IPv4_handler is
generic (
TID: integer:=IPv4_HANDLER_TID);
port (
clk: in std_logic;
--Control for this thread
startThread: in std_logic;
stopThread: in std_logic;
suspendThread: in std_logic;
—Status for this thread
threadIsBlocked: out std_logic;
threadIsFinished: out std_logic;
--Control and status for other threads
isFinished:    in    std_logic_vector((NUM_THREADS-1)
downto 0);
start: out std_logic_vector((NUM_THREADS-1) downto
0);
stop: out std_logic_vector((NUM_THREADS-1) downto
0);
suspend:    out    std_logic_vector((NUM_THREADS-2)
downto 0);
isBlocked:    in    std_logic_vector((NUM_THREADS-1)
downto 0));
```

What is claimed is:

1. A method for generating executable threads, comprising:
   determining, using a computer, from source code specification of each of a plurality of threads, variables of a data structure referenced by the thread;
   wherein the data structure is a shared data structure in the source code specifications of the plurality of threads;
   generating for each of the plurality of threads, a respective adaptation of a source code specification of the shared data structure, wherein each adaptation includes only the variables of the shared data structure determined to be referenced in the source code specification of the respective thread;
   replacing the shared data structure in the source code specifications of the plurality of threads with the respective adaptations; and
   compiling into respective object code segments, the source code specifications of the plurality of threads using the respective adaptations, wherein each object code segment requires memory space for only those variables included in the respective adaptation;
   wherein the source code specification of the data structure describes a network packet and the variables are fields of the packet, the respective adaptations specify respective portions of the network packet, and the respective object code segments are configured to operate on the respective portions of the network packet stored in separate memories while executing on respective processors.

2. The method of claim 1, wherein each adaptation of the source code specification of the data structure is a header file.

3. The method of claim 1, wherein the source code specification of at least one data structure describes an internet protocol packet.

4. The method of claim 1, wherein the source code specification of at least one data structure includes a source address and a destination address.

5. The method of claim 1, wherein the source code specification of at least one data structure includes a protocol version code.

6. The method of claim 1, wherein the source code specification of at least one data structure includes a checksum.

7. The method of claim 1, wherein the source code specification includes a value indicating a length of the network packet.

8. An system for generating executable threads, comprising:
   at least one processor;
   a memory coupled to the at least one processor, wherein the memory arrangement is configured with program code that when executed by the processor causes the processor to perform the operations including:
   determining from source code specification of each of a plurality of threads, variables of a data structure referenced by the thread;
   wherein the data structure is a shared data structure in the source code specifications of the plurality of threads;
   generating for each of the plurality of threads, a respective adaptation of a source code specification of the shared data structure, wherein each adaptation includes only the variables of the shared data structure determined to be referenced in the source code specification of the respective thread;
   replacing the shared data structure in the source code specifications of the plurality of threads with the respective adaptations; and
   compiling into respective object code segments, the source code specifications of the plurality of threads using the respective adaptations, wherein each object code segment requires memory space for only those variables included in the respective adaptation;
   wherein the source code specification of the data structure describes a network packet and the variables are fields of the packet, the respective adaptations specify respective portions of the network packet, and the respective object code segments are configured to operate on the respective portions of the network packet stored in separate memories while executing on respective processors.

9. An article of manufacture, comprising:
   a non-transitory processor-readable storage medium configured with processor-executable instructions for generating executable threads by performing the steps of,
   determining from source code specification of each of a plurality of threads, variables of a data structure referenced by the thread;
   wherein the data structure is a shared data structure in the source code specifications of the plurality of threads;
   generating for each of the plurality of threads, a respective adaptation of a source code specification of the shared data structure, wherein each adaptation includes only the variables of the shared data structure determined to be referenced in the source code specification of the respective thread;

replacing the shared data structure in the source code specifications of the plurality of threads with the respective adaptations; and compiling into respective object code segments, the source code specifications of the plurality of threads using the respective adaptations, wherein each object code segment requires memory space for only those variables included in the respective adaptation;

wherein the source code specification of the data structure describes a network packet and the variables are fields of the packet, the respective adaptations specify respective portions of the network packet, and the respective object code segments are configured to operate on the respective portions of the network packet stored in separate memories while executing on respective processors.

10. The article of manufacture of claim 9, wherein each adaptation of the source code specification of the data structure is a header file.

11. The article of manufacture of claim 9, wherein the source code specification of at least one data structure describes an internet protocol packet.

12. The article of manufacture of claim 9, wherein the source code specification of at least one data structure includes a source address and a destination address.

13. The article of manufacture of claim 9, wherein the source code specification of at least one data structure includes a protocol version code.

14. The article of manufacture of claim 9, wherein the source code specification of at least one data structure includes a checksum.

15. The article of manufacture of claim 9, wherein the source code specification of at least one data structure describes a network packet and includes a value indicating a length of the network packet.

* * * * *